C. L. NELSON.
CASH REGISTER.
APPLICATION FILED JUNE 10, 1905. RENEWED MAY 10, 1915.
1,162,801.
Patented Dec. 7, 1915.
12 SHEETS—SHEET 6.
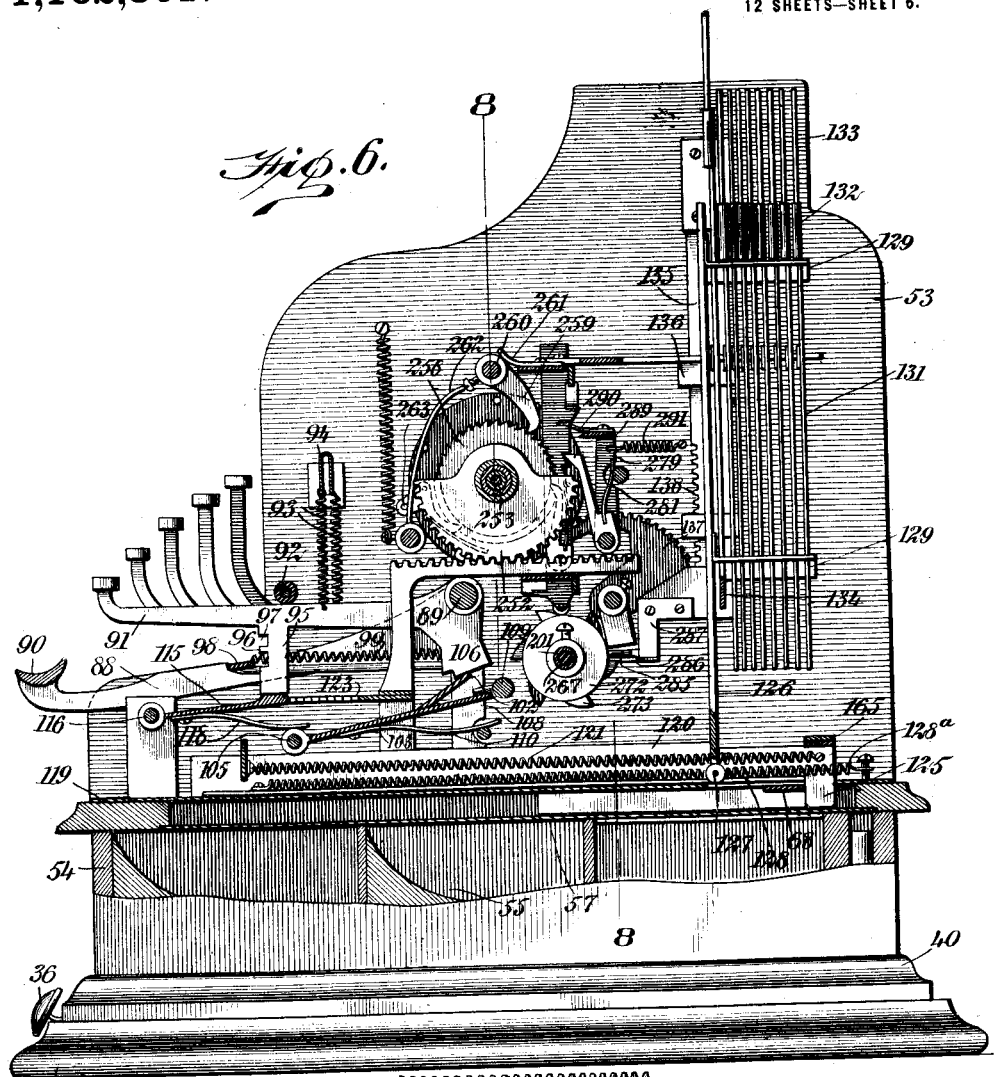
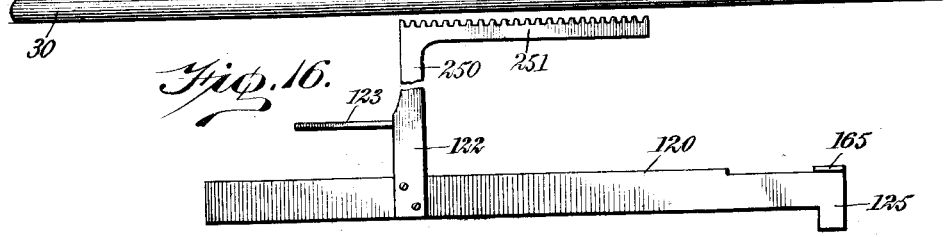
WITNESSES:
INVENTOR
Carl L. Nelson
BY
ATTORNEYS C. L. NELSON.
CASH REGISTER.
APPLICATION FILED JUNE 10, 1905. RENEWED MAY 10, 1915.
1,162,801.
Patented Dec. 7, 1915.
12 SHEETS—SHEET 7.
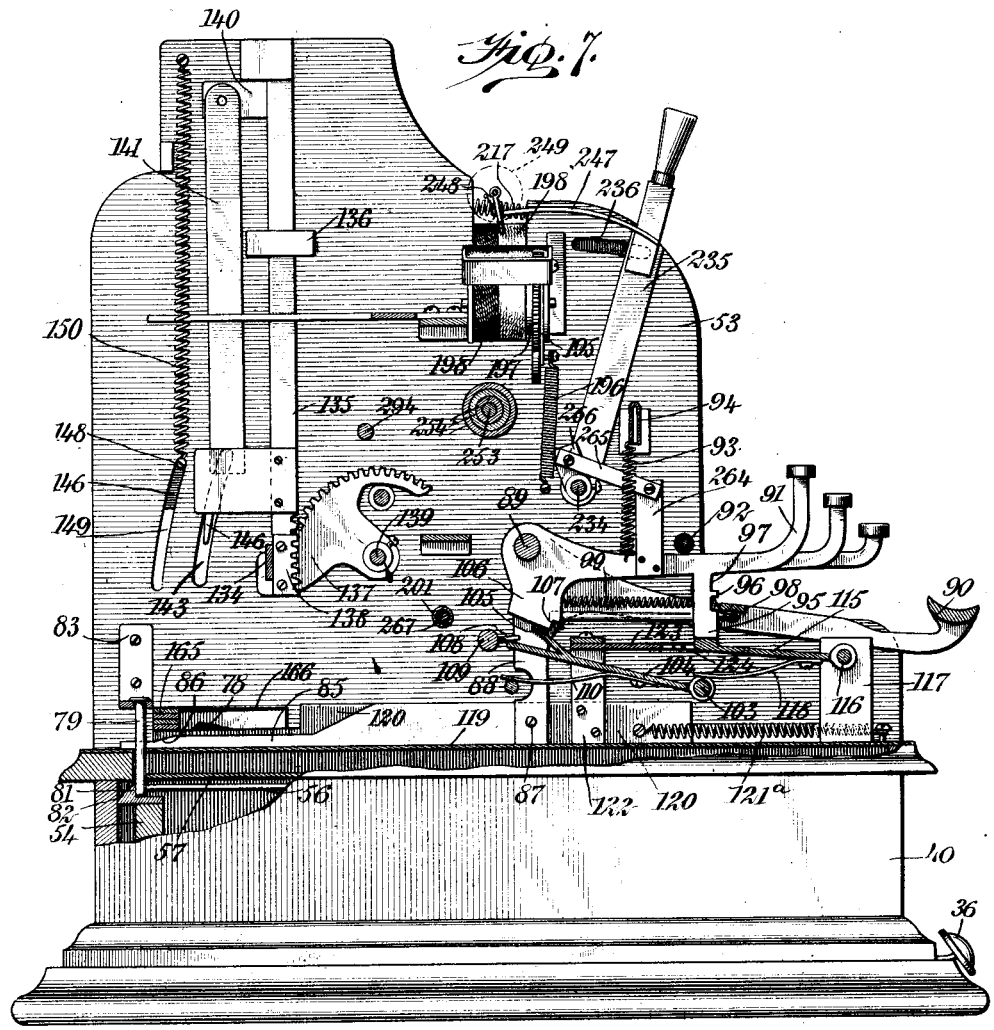
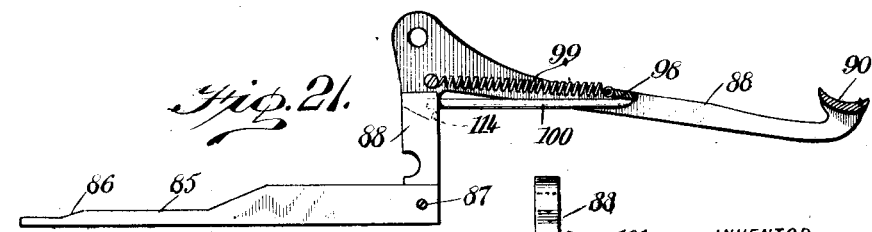
WITNESSES:
INVENTOR
Carl L. Nelson
BY
ATTORNEYS

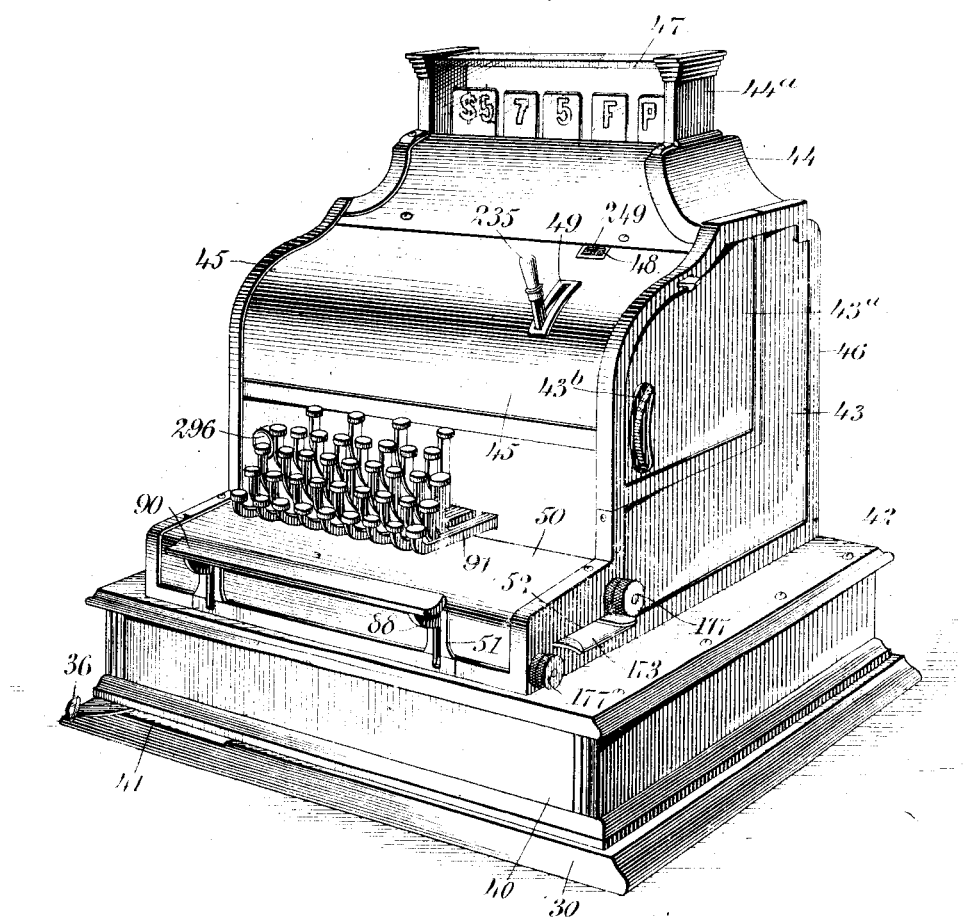

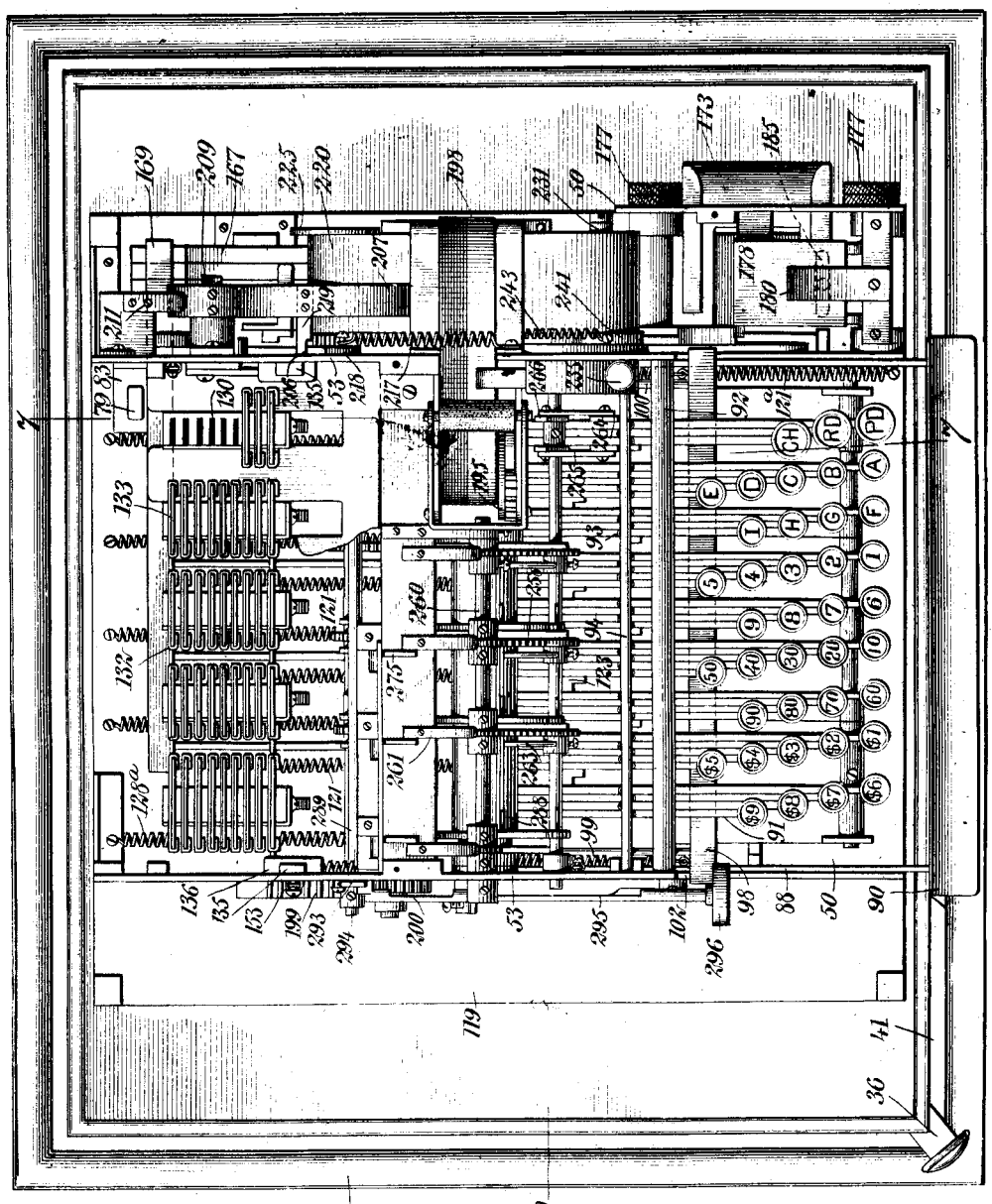

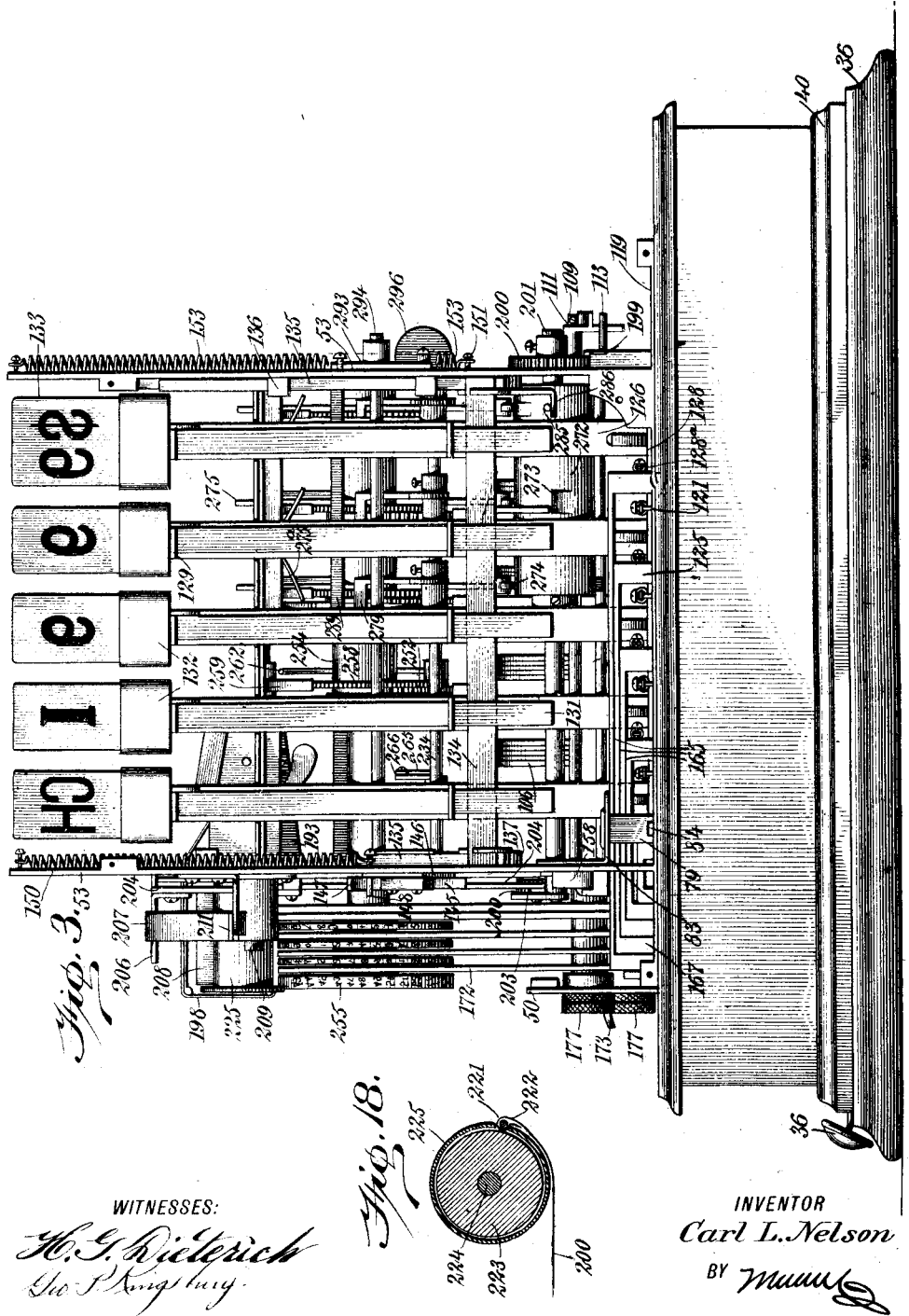

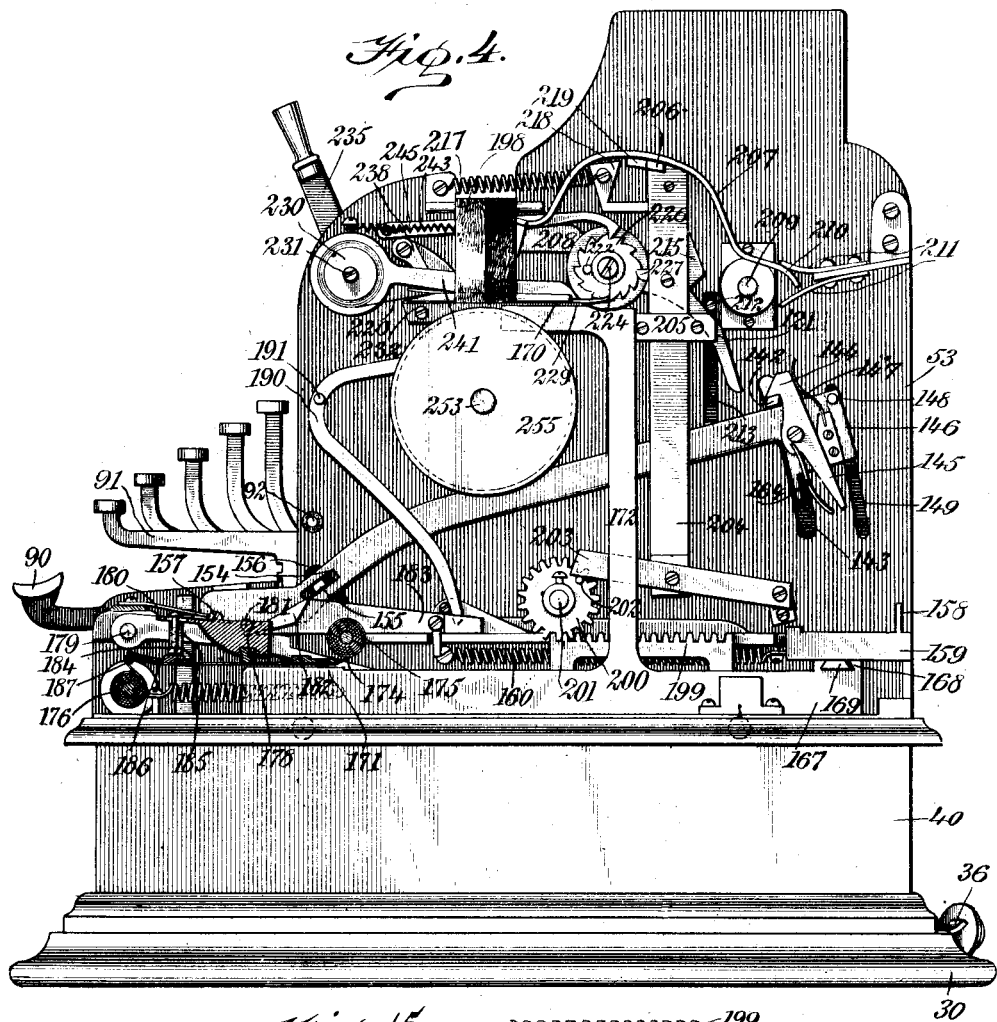

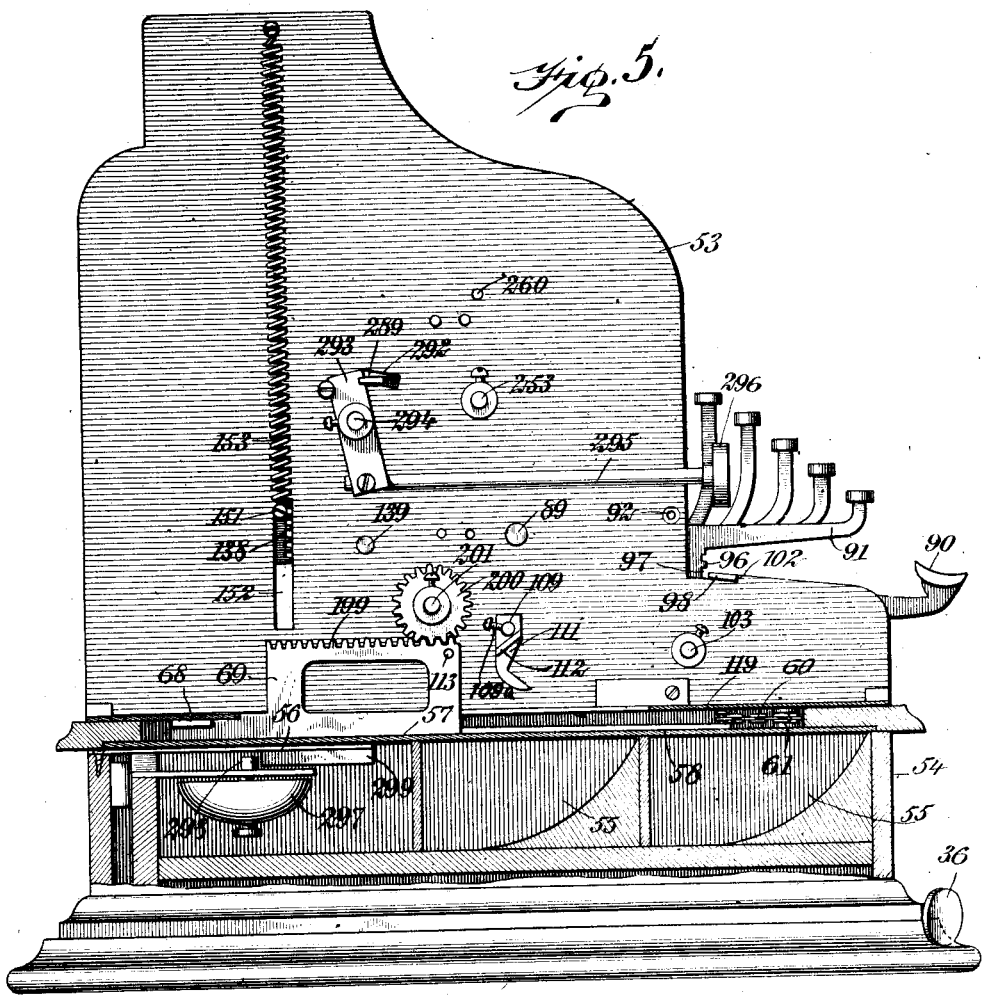
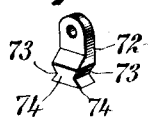
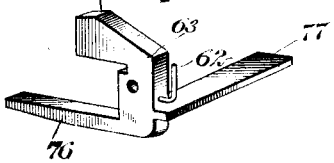

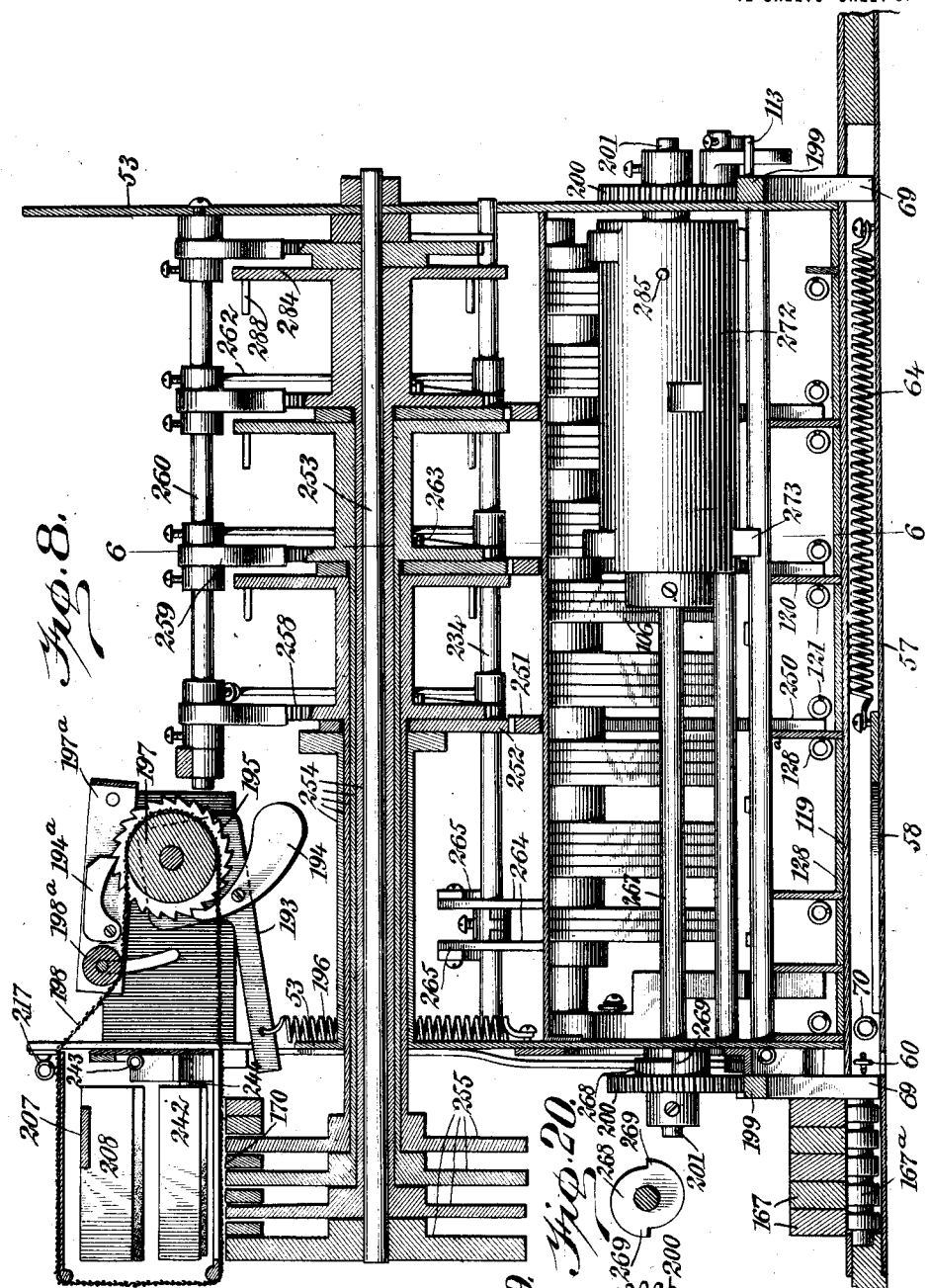

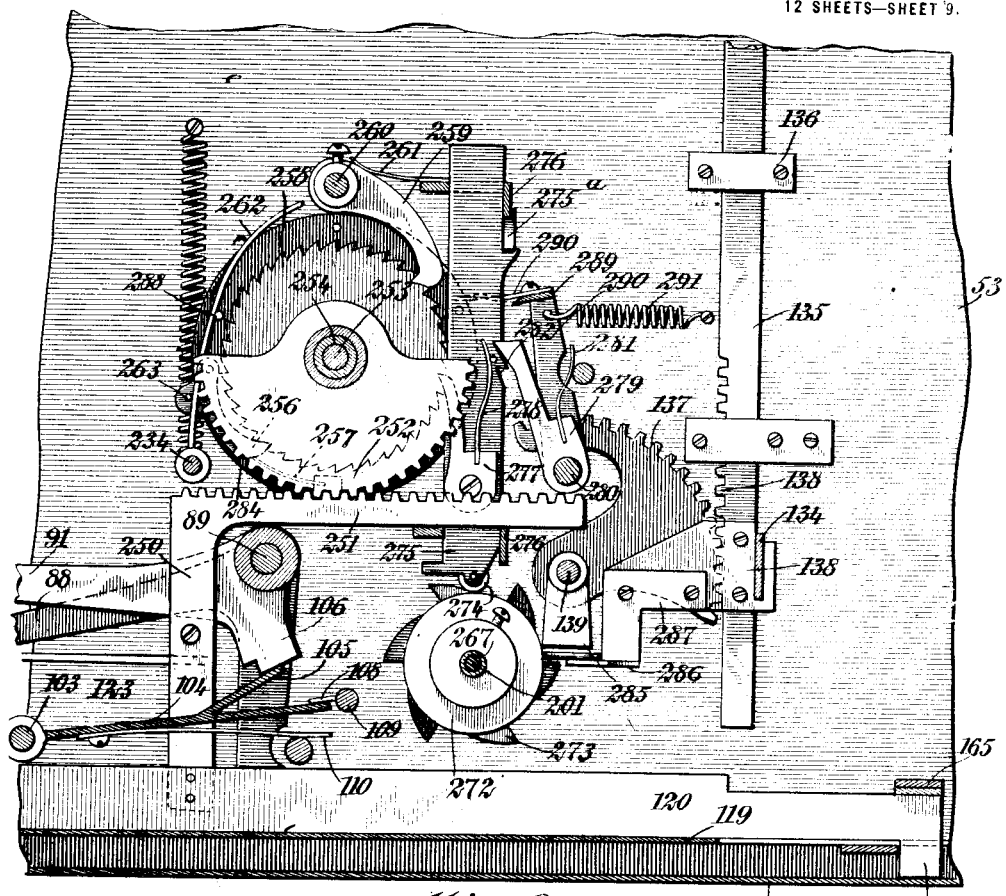
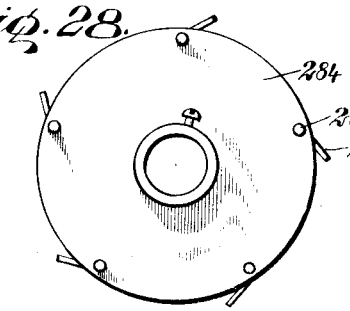
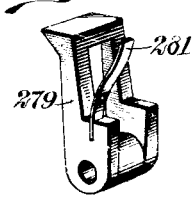

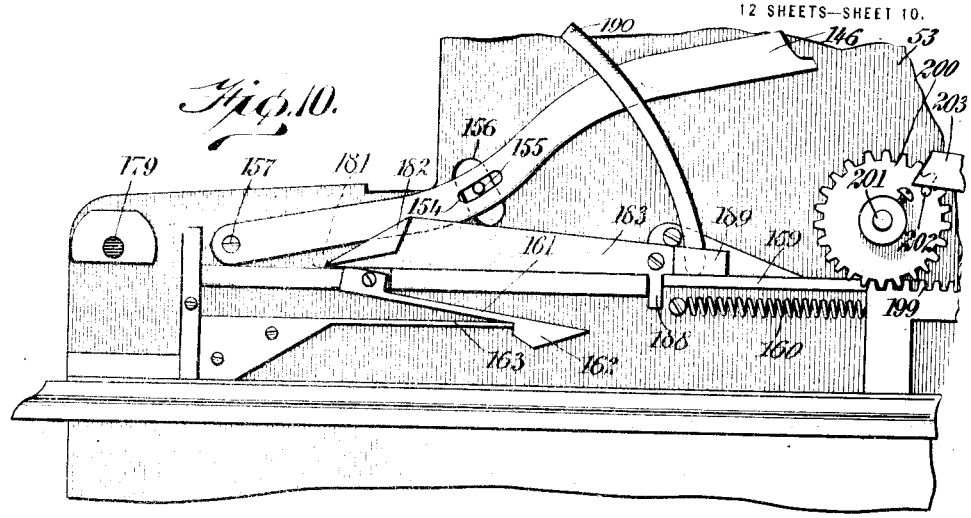

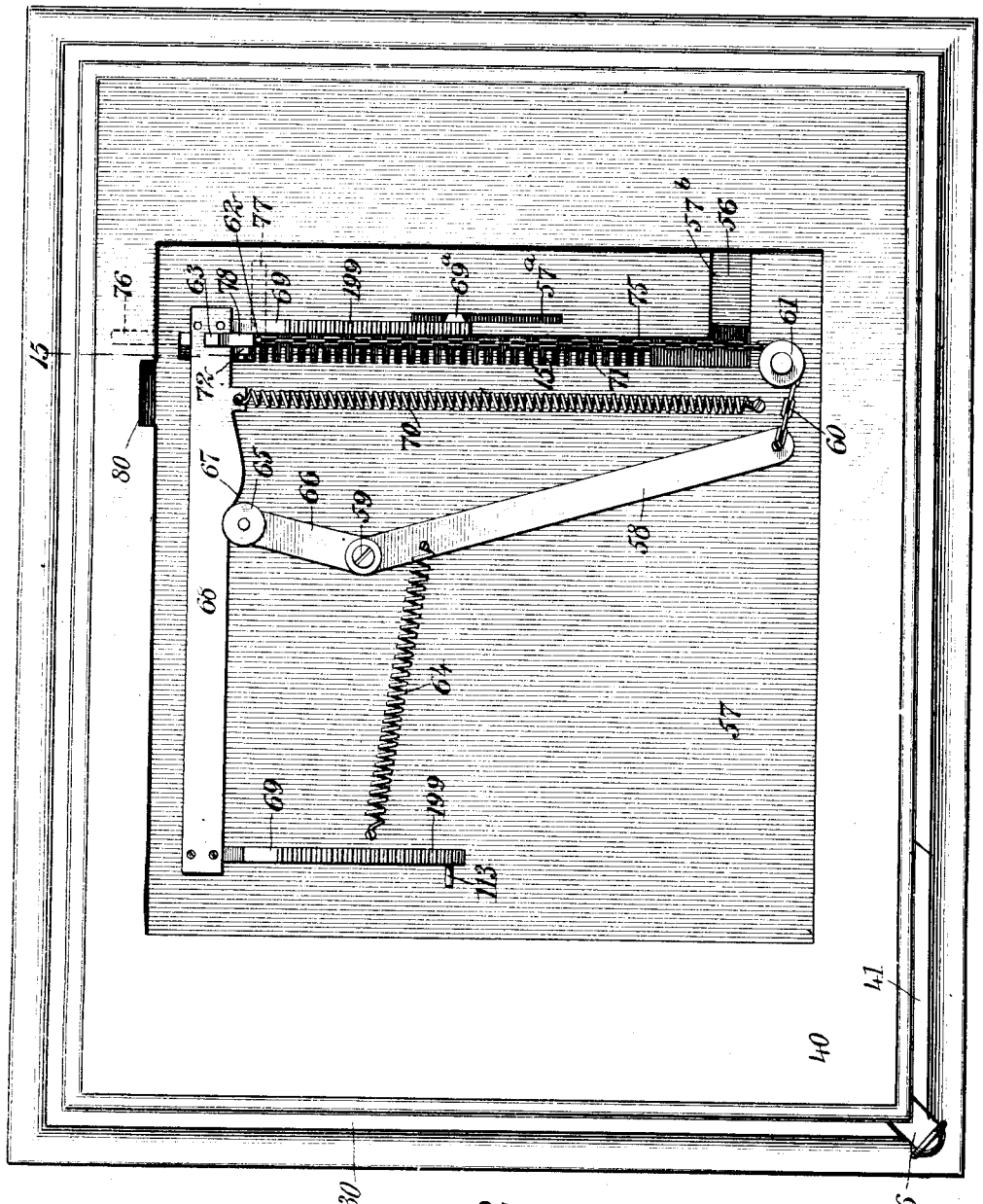

C. L. NELSON.
CASH REGISTER.
APPLICATION FILED JUNE 10, 1905. RENEWED MAY 10, 1915.
1,162,801. Patented Dec. 7, 1915.
12 SHEETS—SHEET 12.
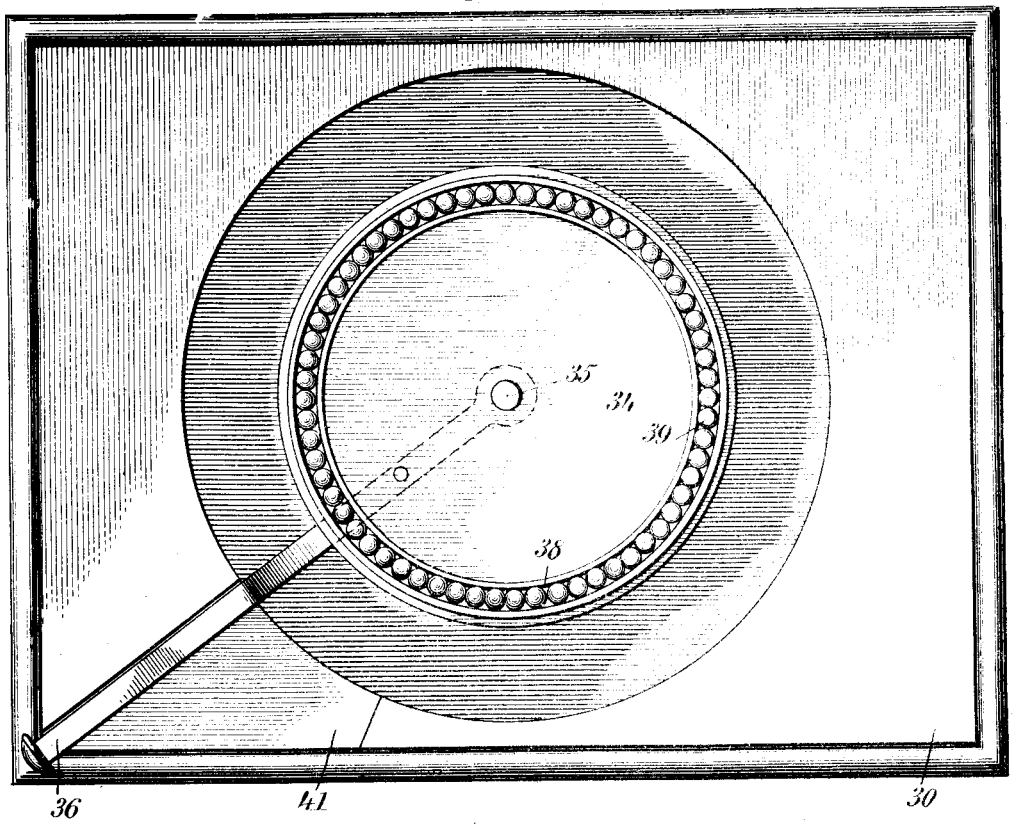
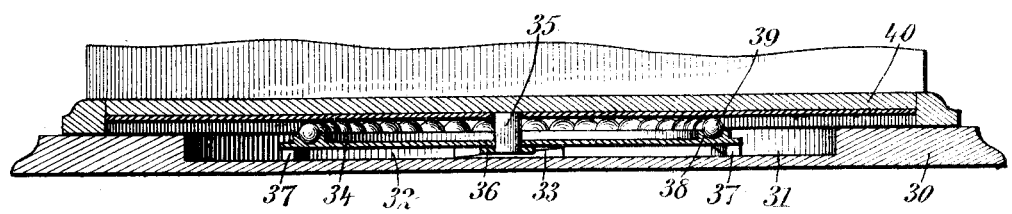

UNITED STATES PATENT OFFICE.

CARL L. NELSON, OF SEATTLE, WASHINGTON, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

1,162,801. Specification of Letters Patent. Patented Dec. 7, 1915.

Application filed June 10, 1905, Serial No. 264,610. Renewed May 10, 1915. Serial No. 27,239.

*To all whom it may concern:*

Be it known that I, CARL L. NELSON, a citizen of the United States, and a resident of Seattle, in the county of King and State of Washington, have invented a new and Improved Cash-Register, of which the following is a full, clear, and exact description.

My invention has for its principal objects the improvement and simplification of cash registers and provision thereof with means for accomplishing certain new results.

More specifically the objects of the invention include, among others which will appear below, the provision of an automatic drawer-operated machine with means for not only registering the amount of the purchase or transaction in such a manner as to show figures which can be read from both sides of the machine on account of transparent indicators, but also for presenting these figures in their normal position instead of that which is usually a feature of cash registers; also means for printing details or separate transactions, and totals in different colors (the means for printing totals being adapted to print any desired figures); means for printing slips or checks which can be taken from the machine; means for locking the keys and unlocking each one in a set when another in the same set is operated, thus permitting correction if the wrong key is struck and the error is discovered before the amount is registered; providing an improved zero-setting device; mounting the machine so as to permit of turning it into any desired position, and providing other features for the general improvement of cash registers.

Reference is to be had to the accompanying drawings forming a part of this specification, in which similar characters of reference indicate corresponding parts in all the figures.

Figure 1 is a perspective view of a cash register embodying my present improvements; Fig. 2 is a plan of the same with the covering frame removed; Fig. 3 is a rear elevation without the cover; Fig. 4 is an elevation of the right end of the machine without the cover; Fig. 5 is an elevation of the left end of the machine with the cover removed and parts shown in section; Fig. 6 is a sectional view on the line 6—6 of Fig. 8; Fig. 7 is a sectional view on the line 7—7 of Fig. 2; Fig. 8 is a sectional view on the line 8—8 of Fig. 6; Fig. 9 is a sectional view on the line 6—6 of Fig. 8, on a larger scale than Fig. 6 and with parts removed; Figs. 10 and 11 are elevations on an enlarged scale of elements shown in Fig. 4, with certain parts removed; Fig. 12 is a plan of the table on which the machine is supported; Fig. 13 is a plan of a base for supporting the table; Fig. 14 is a central sectional view of the parts shown in Fig. 13, showing the table in position; Fig. 15 is a fragmentary sectional view on the line 15—15 of Fig. 12; Fig. 16 is a detached detail view of an element shown in Fig. 9; Fig. 17 is a detail view of a graduated stop; Fig. 18 is a transverse sectional view of a printing roll; Figs. 19 and 20 are views of details; Fig. 21 is a side elevation partly in section, of the operating bar with attachments; Fig. 22 is an end elevation of the same; Figs. 23, 24, 25, 26 and 27 are perspective views of details; and Fig. 28 is an end elevation of a detail.

*Base of the machine.*—For the purpose of supporting the machine in such a way that it can be turned into any desired position, I provide a base 30, shown in Figs. 13 and 14. This base is provided with a depression 31, upon which is a circular body 32 having a series of inclined surfaces 33. Upon this circular body is mounted a plate 34. This plate is centered by a pin 35, preferably located in line with the center of the machine, and is provided with a handle 36 rigidly connected therewith and extending into a position from which it can be manipulated by the operator, and designed for turning the plate. The plate is provided with lugs 37 having inclined surfaces adapted to engage the inclined surfaces 33 and to ride up upon them when the handle is turned. The plate 34 is provided with an annular groove 38 for receiving ball-bearings 39 or the like. On these ball-bearings rests the underside of a table 40, which is also centered by the pin 35, and is adapted to rotate about the latter. The operation of this part of the device is very simple. When the handle 36 is in the position shown in Fig. 13, the inclined surfaces 37 are in the position shown in Fig. 14, and the table rests upon the base 30. When the handle, however, is oscillated in a depression 41 in the base, to a position against the right-hand edge of said depression, the surfaces 37 are forced to move upwardly along the surfaces 33, and this raises the plate 34 so that the table is supported by the bearings 39. In this position the table can obviously be rotated by hand in a very easy manner to any desired position.

*Table and frame.*—The table is provided with a cover 42 (Fig. 1) which is removable from the table and supports the various parts of the frame or casing. The casing itself is shown as consisting of several parts forming ends 43, a top 44, a front-side 45, and a rear-side 46. One end 43 is provided with a removable panel 43ª having a slot 43ᵇ for a purpose to be described. The top is provided with an extension 44ª, having transparent walls and top 47. The front may be made in several pieces and is provided with a slot 48 for viewing a counter, and with a second slot 49 for a printing lever. In the front of the machine is located a small casing 50, which can be readily removed, and which is provided with openings 51 and 52 in its front and end walls respectively (Figs. 2 and 3). Within the casing are a pair of longitudinal side-walls 53 having numerous passages and openings for receiving the various parts of the mechanism, and for supporting them. There are several other details which constitute a part of the frame, and which will be referred to in a description of the elements with which they are connected.

*Drawer operating mechanism.*—The table is hollow (see Fig. 5) and is provided with a drawer 54 which is preferably provided with compartments 55 and has a plate 56 at the rear. Above the drawer the table is provided with a plate 57 for supporting part of the operating mechanism for the drawer (Figs. 12 and 15). Upon this plate is mounted a lever 58, the latter being pivoted to the plate by means of a pin 59. This lever is connected, by means of a chain 60 or other flexible connection passing around a pulley 61, with the drawer. This chain is shown as being connected with a hook 62 mounted on a bracket 63 mounted upon the plate 56. A spring 64 mounted on the plate 57 normally pulls the lever away from the pulley 61 and constantly exerts a motive force for opening the drawer. At the beginning of the motion of opening the drawer it is retarded by the bearing of a roller 65 on a short arm 66 of the lever 58 against a cam surface 67 on a bar 68. The purpose of this is to avoid the rapid motion which would be given to the drawer by the motor spring 64, and to permit the drawer to close with a sharp motion at the end of the stroke. The bar 68 is connected (see Fig. 5) to a pair of slides 69 movable on the plate 57, and it is normally forced toward the roller 65 by means of a motor spring 70, which although acting to produce motion in the same direction as the spring 64, is designed especially for another office which will be described below. The motion of the bar 68 is kept in a straight line by means of the slides 69, as they are constrained to move in parallel lines by the end-pieces 53 of the frame against which they are placed, and by a projection 69ª (Fig. 12) moving in a slot 57ª.

The plate 57 is provided with a rack 71 (Fig. 12) along which the bracket 63 passes. In order to prevent the drawer from being partly opened or closed and the motion stopped without completing it, this bracket is provided with a hanging pawl 72 (Fig. 15). This pawl is pivoted at a point well above its center of gravity, and on the lower part is provided with two notches 73 (Fig. 25) having oppositely extending teeth 74 below them. As the pawl passes over the rack in either direction it will be forced to the rear with respect to the direction of motion, and one of the teeth 74 passing along the top of the rack will be at all times in a position to engage the rack and stop the drawer if it is attempted to move it in the other direction. When the end of the rack is reached, however, the pawl is permitted to drop from it so as to assume the position shown in Fig. 15, and then upon reversing the motion of the drawer the same conditions are repeated. The plate 57 is provided with a slot 75 for receiving the pawl and the bracket 63. The bracket 63 is provided (Figs. 15 and 26) with a projection 76 extending to the rear, and a projection 77 extending to the side and by which it is guided below the cover-plate 57. It is also provided with a cam surface 78 which projects through the slot 75 and engages certain mechanism which will be described below. The plate 57 has a slot 57ᵇ through which the projection 77 can be inserted.

From the construction so far described, it will be seen that the opening of the drawer by the operation of the spring 64 causes the bar 68 to move to the front in Fig. 12 a certain distance, taking with it the slides 69; also that the bracket 63 is simultaneously caused to move with the drawer throughout the length of the slot 75, carrying with it the pawl 72, the latter passing over the rack 71 and preventing the movement of the drawer in the wrong direction. It will also be seen that the drawer is compelled to start to open with a slow motion, and that after the start is made the motion will increase, according to the natural acceleration of speed due to the spring 64, while in closing, the drawer can be forced back against the resistance of the spring, and at the end of the stroke it can easily be moved to its extreme position.

*Drawer locking and releasing device.*—In closed position the drawer is intended to be held by the operation of a pin 79 (Fig. 7)

passing through a slot 80 in the table, and normally dropping by gravity in front of a projection 81 on the drawer. This projection has a slanting surface 82 at the rear in order to assist in forcing the pin up when the drawer is closed, and assure that it will reach the top of the incline and fall behind the projection. This pin therefore automatically locks the drawer in closed position when it is forced to the end of its stroke, and it must be displaced before the drawer can be opened. In order to accomplish this result the pin extends upwardly some distance from the top of the table, and is provided with a guide 83. It is also provided with a passage or notch 84 through which passes the end of a bar 85 (Figs. 7, 21 and 22). This bar is provided with a slanting or cam surface 86, which upon being moved to the rear will engage the top of the slot 84 and lift the pin. For the purpose of moving this bar it is pivotally connected by a bolt or pin 87 with a bell crank 88, which is pivoted upon a shaft 89 passing through the machine from one end frame 53 to the other. This bell-crank is shown (Fig 2) as being duplicated at the two ends of the machine, the two parts of it being connected by an operating bar 90. This operating bar preferably extends across the front of the machine so that it will be within easy reach of an operator at all times. Obviously the depression of the operating bar causes the reciprocation of the bar 85 to the rear, and the engagement of the surface 86 with the pin 79 so as to raise the latter and allow the drawer to be opened by the mechanism described.

*Keys and key-locking mechanism.*—On the shaft 89 are also pivoted several sets of key-bars 91 (Fig. 7). Each key-bar is normally held in elevated position against a rod 92 by means of a spring 93 connected with a bar 94 passing across the machine. Each key is also provided with a projection 95 extending below and having a tooth 96 upon one side thereof thereby providing two spaces 97. On one arm of each bell-crank 88 is slidingly mounted a cross-bar 98 which is adapted to enter the spaces 97 and lock the keys in their raised or depressed position. This bar is normally forced under tension by a spring 99 into said spaces, but under certain conditions it is held away from the projection 95 by means of a bar 100 mounted upon each of the bell-cranks. This bar is held in a depression 101 in the bell-crank and is rigidly connected with the bar 98 so that it prevents the latter from yielding to the spring 99 beyond a certain point. When the operating bar is depressed, the short arm of the bell-crank moves to the rear of the shaft 89 and permits the bar 98 to move inwardly with it, but when the operating bar is raised, the rod 100 being forced to the front by the short arm of the bell-crank holds the bar in a position toward the front where it will not engage in the spaces 97. This motion is permitted on account of the fact that the bar 98 can slide in slots 102 on the two end frames 53. When this bar is in the position shown in Fig. 7, the keys can be depressed and raised at will, but when the operating bar is lowered the cross-bar will move into the spaces which are opposite it and lock all the keys, either in depressed or raised position, according to their condition.

On reference to Fig. 2 it will be noticed that the keys are arranged in several sets, those shown being sets for registering different columns of figures, with two additional sets, one for registering an initial, and the other for registering other matters, as for example, charged, received, and paid. The keys are designated according to the matter that they are intended to register. I have provided an error-correcting device for each set of keys, whereby if the wrong key is struck and the error is discovered before the manipulation of the operating bar 90, it can be corrected merely by striking the right key. For this purpose (Figs. 7 and 9) I have shown a rod 103 on which are pivoted a series of plates 104, one plate for each set of keys. Each of these plates is provided with a projection 105, and each of the keys is provided with a projection 106 having a notch 107 adapted to engage the end of the projection 105. All the keys of one section are so arranged as to permit their notches engaging the projection 105, and it will be seen that when a key is depressed these parts register with each other and the key is held temporarily in depressed position. In depressing the keys sufficiently to cause them to be locked in this manner they have to be forced to a point farther down than that at which they remain after being locked. If the wrong key is depressed, the depression of another in the same set will force the plate down to this low point, and will release the key already locked, while retaining the key being depressed and locking that when pressure is removed from it. This provides for the correction mentioned above, and it also prevents the registering or attempted registering of two figures in the same set of keys.

In order to release the keys after the registering operation is entirely completed, the plates 104 project to the rear far enough to be engaged by pins 108 on a rotatable rod 109 which passes across the machine. A spring 110 normally holds each plate in elevated position, but the oscillation of the rod 109 will obviously depress all the plates and unlock all the keys that may be held by them. In order to accomplish this result automatically when the drawer is closed, I provide the rod 109 where it passes through the left-hand frame 53 with a swinging pawl 111, (Fig. 5,) having one surface curved and the other surface being provided with a tooth. This pawl has an inclined rib 112, which upon moving to the rear engages a screw or stud 109ª on the shaft, and carries the shaft around with it. On the slide 69 which is located on this side of the machine is placed a pin 113 which is adapted to engage the pawl 111, and upon its rearward motion will rotate the rod 109 sufficiently to cause all of the plates 104 to be depressed and release the keys and operating bar. The operating bar is provided with a tooth 114 (Fig. 21) which engages the right-hand plate 104 when the operating bar is depressed. This feature operates in the same manner as the keys. When the operating bar is released by rocking shaft 109 it ascends and carries the cross-bar 98 into an outward or unlocking position. The keys will then fly up on account of the operation of the springs 93, if the bar 98 is out of engagement with the spaces 97, which will be the case at this time because the operating bar has been raised as described. The keys are therefore in condition to be depressed.

*Indicating device.*—The projections 95 on the keys bear upon the plates 115 (Figs. 6 and 7). One of these plates is provided for each of the sections of keys, and they are preferably pivoted upon a rod 116 which is mounted upon a pair of standards 117 constituting a part of the frame. These plates are normally held in elevated position by springs 118 bearing upon the shaft 103 or upon any other convenient part of the machine. Located upon a plate 119 above the table are a series of slides 120 normally urged toward the front of the machine by springs 121, (Fig. 6). The machine is provided with one of these slides for each section of keys, and each slide carries a standard 122 bearing a plate 123 having a series of teeth 124 upon its front edge as shown in Fig. 17. The number of teeth is equal to the number of figures or other characters to be registered in the set to which the plate belongs. The front tooth represents the first character, as for example zero in a set of numbers, the second "1", and so on to "9". When the plate 115 is in elevated position the first step or tooth is against it and the machine is in condition to register zero. When one of the keys is depressed, the end of the plate 115 is removed from the teeth, and the projection 95 upon the key depressed is placed in the path of the plate 123. The keys are so arranged that these depressions are in front of these teeth in regular order. For instance, key No. 1 is directly in front of the tooth which corresponds to the numeral 1 and which represents a single step from the zero key. Consequently when a key is depressed and the slide is permitted to move forward by means to be described, it will move up to such position that the proper tooth will engage the projection on the key which is depressed, and this constitutes a limit for its motion. But when no key of any particular set of keys is depressed, the manipulation of the operating bar will not allow the parts connected with that set to move at all, because the first tooth of the plate 23 of that set is in engagement with the rear of the plate 115.

Each slide 120 is provided (Figs. 6 and 9) with a downwardly extending projection 125 which passes through the plate 119 behind the bar 68. The latter is intended to keep all of the slides 120 in their normal position when the drawer is closed, but when open this bar yields and consequently all the projections 125 are allowed to yield, and forced to do so by the springs 121, a spring 121ª being employed to operate the slide which is at the right. Upon moving in this way when the drawer opens, these slides will be stopped at a distance of one or more steps from their original position, according to that key which is depressed. Located adjacent to each slide is an indicator carriage 126 (Figs. 3 and 6), preferably running on wheels 127 in a direction parallel to that of the motion of the slides. Each carriage is provided with a bottom plate 128 which slides upon the top of the plate 119. The rear surfaces of these plates are located in the path of the projections 125 corresponding with the same set of keys, consequently as these projections are drawn forward with their slides by means of the springs 121 and 121ª, they will engage the carriages and move them a distance equal to that which they move themselves. The carriages are impelled toward the rear by springs 128ª. Each of these carriages supports a pair of guides 129, each guide being provided with a series of slots 130 equal in number to the number of keys in the set corresponding to that particular carriage. In these slots are guided a corresponding series of indicator-holders 131. Each of these holders is provided preferably at the top with a casing 132, in which is mounted an indicator 133. These indicators are preferably formed of glass or other transparent material, and the numbers which indicate the transaction to be registered are preferably placed upon the front side, and instead of each number representing the whole number corresponding to that on the key, they are designated in such a manner that the number shown at the front appears in the regular order. In many cash registers as heretofore constructed the indicator corresponding to a number of two figures, as for example "20 cents", bears the numeral "20", and accordingly, when another numeral is rung up, the number appearing on the register does not clearly indicate the amount registered, because in the case of 21 cents the numbers appearing in sight are 20 and 1. In the present case, with the same number, the ordinary figures would appear for the indicator representing 20 cents is supplied merely with the numeral "2". The same principle is carried out throughout the machine.

It will be readily understood that with the mechanism so far described, the position of the indicators is controlled by the keys, and that there must be a line across the machine which will intersect all of the indicator supports which correspond to the keys depressed, or to the zero keys belonging to those sets in which no number is to be registered. This line is the line directly under the indicator supports of the zero indicators when the latter are in the normal position, and all that it is necessary to do in order to move the proper indicators into a more elevated position, where they can be seen from the front and back, is to place a bar 134 across the machine in a position directly under the original position of the zero indicators, and, to raise this bar in such a manner as to elevate all the indicator-holders which are above it and rest upon it. This bar 134 is mounted upon sliding bars 135 (Figs. 7 and 9) guided to move vertically by guides 136 and by segments 137 meshing with racks 138 on the sliding bars and mounted on a shaft 139. In order to manipulate these parts one of the bars 135 is provided with a projection 140 to which is pivoted a connecting rod 141. This connecting rod is provided with a stud 142 (Fig. 4). This stud projects through a curved slot 143 on the right-hand side plate 53, and its upper surface is inclined so as to form a good seat for a catch 144 which is mounted upon a lever 145. This lever is pivotally mounted upon a lever 146 pivoted at 157 and is normally held in such a position as to readily engage the stud 142 by a spring 147. The lever 146 is provided with a stud 148, which if desired may extend through a slot 149 in the side plate so as to receive an operating spring 150 which normally holds the lever 146 in elevated position and returns it to that position when displaced. The bar 134 has a stud 151 (Fig. 5) passing through a slot 152 in the left-hand side plate, and provided with an operating spring 153 for lifting the bar. These parts provide for lifting the bar 134, exposing the indicators which correspond with the keys depressed, and leaving the parts in such position that the catch 144 is free to engage the stud 142.

The lever 146 is provided with an inclined and elongated slot 154 (Fig. 4) through which passes a projection 155 upon one of the operating levers 88. This projection passes through a slot 156 in the side frame, and obviously when the operating bar 90 is depressed it will act upon the lever 146 through the slot 154 to turn it about its pivot 157, and this operation will cause the stud 142 and consequently the bar 134 to be depressed. Therefore, the depression of the operating bar results immediately in the lowering of the indicators which at that time appear in sight, or in other words, the indicators which represent the last sum registered. The withdrawal of the bar 134 below the bottom of the indicator-holders 131 permits them to move with the bars 120 to positions determined by the plates 123, and as the drawer slides open a tripping finger 158 which is moved with the drawer engages the lower end of the lever 145 and disengages the catch from the stud 142. This permits the spring 153 to elevate the bar 134 and raise the indicators which correspond to the keys struck. When the operating bar is again raised the lever 146 will be raised with it, and the catch will engage with the stud as before, ready to repeat the operation.

The finger 158 is mounted upon a plate 159 which is normally forced toward the front of the machine by a spring 160 shown in Figs. 4 and 10. This plate is provided with a spring or detent 161 having a head 162 thereon, provided with slanting surfaces. A spring 163 engages at the rear of one of these surfaces and normally holds the plate in its position at the rear of the machine, but as the drawer opens, the cam surface 78 (Fig. 15) engages the lower side of the head 162, forces it out of reach of the spring 163 and permits the spring 160 to pull the whole plate to the front, when the drawer has reached nearly its outmost position exposing the indicators. This causes the finger 158 to engage with the lever 145. The lever 145 is provided with a spring 164 against which the finger 158 is stopped as long as the lever is in depressed position.

*Printing mechanism.*—Each of the differentially movable indicator controlling bars 120 is connected with a cross-bar 165 (Fig. 3) which passes through a perforation 166 in one of the side frames 53. These cross-bars are nested and are connected in any desired way with longitudinally sliding bars 167 (Fig. 4) resting on rollers 167ª. The illustrated connection between these elements is a groove 168 in the rear upper surface of each bar 167, and a projection 169 upon the corresponding cross-bar entering said groove. The bars 167 are preferably provided with two printing surfaces 170 and 171. These may be given any convenient location with respect to each other, but I have shown the former as being mounted at the top of a column 172 and the latter as being mounted at the front end of the bar 167. Both of these printing surfaces are provided with type corresponding to the keys with which the bar is connected, and these type are arranged in regular order as will be readily understood. The type surface 171 is designed for printing slips or checks inside of the machine. For this purpose the machine is provided with guides 173 (Fig. 1) having a passage between them for the reception of the checks. The checks are slipped into the passage above an inking ribbon 174 (Fig. 4). This inking ribbon is mounted upon rollers 175 and 176, which are provided with thumb-wheels 177 for operating them in order to adjust the inking ribbon as desired to provide a fresh surface. Above the inking ribbon is a hammer 178 pivotally mounted on a shaft 179 and normally pressed downwardly by a spring 180. This hammer is provided with a lug 181 adapted to be engaged by a cam 182 (Figs. 4, 10 and 23) on a lever 183 which is pivotally mounted upon the sliding plate 159. When the head 162 is released in the manner described above, the sliding plate 159 moves to the front and the cam 182 causes the pin 181 to ride up its upper inclined surface and to drop off the upper edge thereof, the spring 180 forcing the hammer down, when permitted by this cam, onto the back of the inking ribbon. A blow is thus delivered which will impress the type upon the check or slip. This mechanism has several minor features, comprising an adjusting screw 184 and a spring 185 to hold the hammer up slightly from the paper, these being mounted upon a plate 186 which guides the inking ribbon. A pin 187 above the roller 176 also assists in guiding the ribbon with respect to the last-mentioned plate. The lever 183 is provided with a tongue 188 and with a socket 189 in which works a lever 190. (Figs. 1, 11 and 23.) This lever 190 is pivoted to the frame by a stud 191, and being operated upon each motion of the sliding plate 159 or of the lever 183 its upper curved portion 192 engages at each stroke of the drawer with a lever 193 (Fig. 8) which passes through a slot in the side plate 53, and by pawls 194 and 194ᵃ operates by a step-by-step motion a gear-wheel 195 against the force of a spring 196. This provides for feeding intermittently a roller 197 which carries an inking ribbon 198, preferably made to print in two colors on the sides of the center thereof. (Figs. 2 and 4.) This inking ribbon passes through the side plate 53 to a point above the printing surfaces 170. I have indicated this ribbon as being provided with blue ink upon the rear half and red ink upon the front, the blue-ink half being designed to print from this printing surface, and being located in such position that the type will be moved under it when the bars 167 are moved by the mechanism described above. A pivoted frame 197ᵃ carries a roller 198ᵃ which presses by gravity on the ribbon to keep it taut.

For causing the impression to be made the following mechanism is provided: The slides 69 are each provided with a rack 199 (Figs. 4 and 5). These racks mesh with pinions 200 upon a shaft 201 passing through the machine, and obviously when the drawer is opened or closed the pinions and shaft will be rotated through a portion of a revolution. One of the pinions is provided with a pin 202 adapted to engage a lever 203 pivoted to a side plate 53 and connected with a bar 204. This bar reciprocates in a guide 205, and at its upper end is provided with a projection 206 for engaging an arm 207 which carries a printing hammer 208 (Fig. 11). This arm is pivoted upon a stud 209, and has a projection 210 with which springs 211 engage for the purpose of normally holding it in a certain position and forcing it into a printing position when the necessary mechanism is operated. On the rod 141 is a stud 212 projecting through a slot 213 in the side frame 53, and engaging a cam surface 214 on a lever 215 which is pivoted on a shaft 216. This lever is normally held in a certain position by a spring 217, and is provided with a cam surface 218 having an undercut rear end. The arm 207 is provided with a projection 219 which normally rests upon the top of this cam 218, and occupies the position shown in Fig. 4. The operation of these parts is very simple: When the shaft 201 is caused to rotate by the operating movement of the drawer in the manner described, the pin 202 releases the lever 203, allowing arm 204 and projection 206 to drop. As the bar 134 is at this time in depressed position and cam 218 moved rearward, the projection 219 drops slightly until it rests on cam 218, and consequently when the bar 134 moves up as the projection 158 strikes 145, pin 212 will rise and allow 218 to move forward from under 219 when the hammer drops to make an impression, the projection 219 slides over the rear edge of this cam and rests upon the top surface of it. As the bar 134 is raised, the stud 212 slides down the inclined surface of the arm 211 and permits the cam 218 to be withdrawn from its position by the spring 217. By this time the pin 202 has permitted the lever 203 to drop so that the projection 206 does not interfere with the operation of the arm 207, and the latter is forced into a striking position upon the back of the blue portion of the inking ribbon, and provides the impression. The rear of the lever 203 acts as an abutment for the cushioning spring 164.

As shown in Fig. 18, the paper 220 upon which the impression is to be made is provided with a loop 221 in its end, which is passed over a pin 222 fixed to a roller 223. This roller is mounted on a shaft 224, and after the paper is put in place it is secured in position by a slotted sleeve 225 which is passed over the roller. The paper is then wound up on this sleeve, and this operation is made automatic by the provision of a ratchet-wheel 226 on the roller, and a pawl 227 movably mounted upon the slide 204. This pawl is preferably pivoted and is provided with a spring 228 to force it into engagement with the teeth of the ratchet wheel. A spring 229 is employed to prevent the ratchet wheel from moving in the wrong direction. The other end of the paper is wound upon a roller 230 rotatably mounted upon the shaft 231. The paper passes from one roller to the other over a plate or table 232 mounted upon one of the side frames 53, this table being provided with a slot 233 through which the type surfaces 170 can project, or below which they can be placed so as to permit printing by striking the paper above these surfaces with the hammer 208.

*Total printing device.*—The mechanism described above is provided for printing the details or separate transactions to be recorded. It is also desirable to provide means for printing totals or any other figures which it may be desired to place upon the paper or ribbon 220. In order to avoid confusion the ribbon 198, as has been stated, is provided with a red and a blue portion, the blue being shown as so located as to receive an impression from the hammer 208; the red is designed for printing totals. Pivotally mounted upon a shaft 234 is a lever 235 (Fig. 7). This lever projects through the slot 49 of the casing and has a handle by which it can be readily operated. It also extends through a slot 236 in one of the side pieces 53, and engages a sliding plate 237 located above the table 229 (Fig. 11). This plate is provided with a pivotal pawl 238 having a projection 239 (Fig. 24) affording two cam surfaces. Immediately under this pawl is a spring 240, the rear end of which is rigidly mounted upon the slide 237. Pivotally mounted upon the shaft 231 is an arm 241 upon which is mounted a hammer 242. A spring 243 forces the hammer to its lowermost position. The movement of the slide 237 causes a projection 244 on the hammer to ride up the upper inclined surface of the projection 239 and to drop from the upper edge thereof as the pawl passes by. It strikes the red part of the ribbon above the paper, and any type which may be beneath will consequently make an impression. As the projection 244 drops, it lands upon the spring 240, and the forward motion of the slide brings it under the nose of the pawl and beyond it, so that it is ready to slide up the inclined face upon the repetition of the movement described. As the principal object of providing this mechanism is to afford means for printing totals, it is desirable that means also be provided for feeding the paper 220 a greater distance when this mechanism is operated than that which it is fed ordinarily when the details are printed. Accordingly, the slide 237 is provided with a pivoted arm 245, having a tooth 246 for engaging the ratchet-wheel 226. The movement of the slide is sufficient to cause the tooth 246 to move to the rear a distance of two or more teeth on the ratchet-wheel so as to give a greater feed to the paper or ribbon than is accomplished by the pawl 227. The lever 235 has a projection 247 (Fig. 7) adapted to engage the arm 248 of a registering or counting device 249, to register the total number of operations.

*Adding mechanism.*—In order to provide for presenting the proper types to a printing position and to provide for automatically adding the numbers as they are registered, I have shown the following mechanism (Figs. 6 and 7): Each slide 120 is provided with an upwardly extending portion 250, having a horizontal rack 251 at the upper end thereof (Fig. 9). This rack meshes with a segmental gear 252. It will be understood that there is one of these gears for each set of keys that represents numerals. Those representing other matters need not be provided with adding mechanism. On a shaft 253 are a series of concentric tubes 254 (Figs. 8 and 9), and each of these tubes is adapted to be moved by the segmental gears. These tubes extend through one of the side plates 53, and each one is provided with a type-wheel 255. These type-wheels are provided with type corresponding to the characters or numbers to be registered, and it will be obvious that when the slides 120 are moved to the front and stopped by the plates 123 engaging the projections 95 of the key levers, the segmental gears will be rotated a distance represented by the particular teeth of the plates 123 that engage the projections of the key-levers. This operation obviously rotates the type-wheels, and the type are so placed upon them that the distance traversed by the racks 251 is accurately represented by the type number brought to the top of the several type-wheels. If the registration is started from zero, the numbers brought to the top of the type-wheels upon the first operation of the drawer will be exactly the same as those brought to printing position upon the type surfaces 170 and 171, but those on the type surface 170 are under the blue portion of the ribbon, while those on the type-wheels are under the red portion of the ribbon. The operation of the machine without manipulating any part independently, causes the number to be printed from the blue ribbon by means of the hammer 208, and if it is desired to print the number from the red ribbon it can be done by manipulating the lever 235. The typewheels do not oscillate in the manner corresponding to the reciprocation of the type surfaces 170, but at the end of each operation they remain stationary and at the next operation are carried on from their former position; therefore they accumulatively record the several numbers registered, and at any time they are in a position to print the sums of all the numbers which have been registered since the operation of the machine was commenced, and all that is necessary in order to print the total is to ring up "no sale" and manipulate the lever 235.

Each of the segmental gears 252 is provided with a pawl 256 forced by a spring 257 into engagement with the teeth of a ratchet-wheel 258. A toothed pawl 259 on a shaft 260 is pressed by a spring 261 into engagement with the same teeth and prevents backward motion of the ratchet-wheel. This construction provides for feeding the ratchet-wheel a number of teeth equal to the number of teeth of the rack 251 which are fed forward by the opening of the drawer, or in other words, the rotation of the ratchet-wheel is proportional to the motion of the rack 251 and is controlled by the key struck. When the rack is moved forwardly the pawl 256 slides along the teeth in an obvious manner, and the pawl 259 holds the ratchet-wheel in a stationary position at the same time, the adding taking place as the rack is returned to normal rearward position.

*Throwout device for adding mechanism.*—If it is desired to record a number without adding to the amount previously registered, this can be done by disengaging the pawl 256 from the ratchet teeth, and I accomplish this result by mounting a series of rods 262 on the shaft 234. These rods engage at the rear of pins 263 upon the pawls 256, and when the shaft is oscillated to the front they operate to force the pawls out of engagement with the teeth of the wheel and permit the gear segment to oscillate back and forth without rotating the ratchet-wheel, and consequently without advancing the type-wheels and adding the number registered to the total. This is especially desirable in recording amounts charged and paid, and the two keys marked "Ch" and "Pd" are provided with projections 264, (Fig. 7) which by means of links 265 are connected with arms 266 secured to the shaft 234. Consequently the depression of these keys will operate the rods 262, and although the number struck on the keys will be printed by means of the type surfaces 170 and 171, yet they will not be added to the total.

*Carrying device.*—In order to provide for carrying "1" from a column to the next or higher column, and for accurately registering the same, I provide means for turning each ratchet-wheel 258 one step when the one in the column below has rotated ten steps from the zero point. On the shaft 201 is mounted a tube or sleeve 267 (Figs. 6, 8 and 9). This tube is provided with a cam 268, preferably having two teeth 269 oppositely disposed. The gear-wheel 200 upon one side of the machine is provided with a catch 270 (Fig. 19) normally pressed by a spring 271 toward the center of the shaft. As the wheel 200 is oscillated by the rack 199 a distance sufficient to turn it through more than half a revolution each time the drawer is opened, the catch 270 will ride up the cam surface 268 and engage one of the teeth 269 upon one stroke of the rack, while upon the return stroke it will cause the cam and consequently the sleeve 267 to rotate through a half of a revolution. Upon this sleeve is mounted a drum 272, and this drum is provided with several series of teeth 273. Each series comprises in the present case two teeth upon opposite sides of the drum, and located at an angle with respect to each other in the several sets. There are as many sets as there are ratchet-wheels, lacking one. Located in the path of each of the series of teeth is a roller 274 mounted at the bottom of a slide 275. This slide moves vertically in guides 276 and is provided with a pivoted pawl 277 and a spring 278 for forcing the pawl into such position as to engage the teeth of the ratchet-wheel 258. It will be observed that upon each reciprocation of the rack 199, one of the teeth 273 in each set is caused to move past the roller 274 and raised the slide if it is not already in raised position. This causes the pawl 277 to rotate the ratchet-wheel 258 one step. In order to cause this movement to take place only when it is desired to carry "1" from one column to another, a pawl 279 is loosely mounted upon a shaft 280 opposite each slide except that representing the units column. A spring 281 normally forces this pawl toward the slide, and the slide is provided with two notches or teeth 282 in which the pawl is adapted to engage. When the slide is down the pawl engages in the upper tooth, and when it is raised it engages in the lower one and consequently holds the slide in elevated position.

The pawl 279 is wide enough not only to engage the teeth 282 but also to pass beyond the teeth of the ratchet-wheel 258 and into the path of a series of plates 283 upon a disk 284 (Fig. 28). One of these disks is provided for each of the ratchet wheels except that representing the column of highest order, and rotates with it. The office of the plates 283 is to engage the pawl 279 in the next column and throw it out of engagement with the teeth 282 so as to permit the slide to drop. It will be clear, then, that the next oscillation of the drum 272 will cause the slide to rise and feed the ratchet-wheel forward one step, thus carrying "one" to the next higher column. The plates 283 are located opposite the tenth teeth from zero of the ratchet-wheels, and consequently the passage of one ratchet-wheel past this point will cause the carrying mechanism for the next wheel to work and feed that one forward one step. It will be understood that the slides are normally kept in raised position except when the carrying operation is to be performed. In order to limit the motion of the drum 272 it is provided with a pin 285 which engages with a plate 286 on a bracket 287 carried by the cross-bar 134. As the cross-bar is always in raised position after registration, the plate will be brought into such position as to prevent the rotation of the drum beyond the desired point.

*Zero-setting device.*—In order to provide for resetting the type-wheels at zero, I locate a series of pins 288 (Figs. 9 and 28) upon the disks 284 and provide a plate 289 with projections for engaging them. The plate 239 is mounted upon an arm 290 pivoted upon the shaft 280 and held back by a spring 291. The plate projects through a slot 292 in one of the side plates 53, and is engaged by a lever 293 pivoted on a shaft 294 (Fig. 5). A rod 295 having a press-button 296 is employed for turning the lever and moving the plate into operative position. When the plate is moved so that the arms 290 are in the path of the pins 288 the type-wheels can be rotated by hand until one of the pins on each of them engages one of the arms 290. The wheels will then be stopped at zero, and in this simple manner the machine is set in a position for starting. When the zero-setting device is to be operated, the slides 275 should be in elevated position, and the plate 289 is designed to engage in the upper teeth 282 to hold them there when the button is pressed. If any one of the slides is down when it is desired to set the machine to zero, the button cannot be moved and the operator must depress the bar 90 to open the drawer. This will raise all the slides and complete the addition of the last number registered, and permit the button to be moved with the plate 289.

The ratchet-wheels 258 can be made with ten teeth and with a single pin 288 and plate 283 located opposite the tenth one, but I prefer to form them with some multiple of ten, as for example 50, and then there are a similar number of pins and plates so that the operation of turning the wheels one complete revolution will provide for carrying "one" to the next column five times. The corresponding type-wheels are of course provided with five sets of type. The ratchet-wheel and type-wheel at the left, however, are not fixed in this manner, but the former is provided with only one pin and plate, and the latter with only one series of numbers running in the present instance from 1 to 50. This provides for continuously adding in this column up to the point indicated.

In Fig. 5 I have shown a bell 297 provided with a hammer 298 adapted to be operated by a cam surface 299 when the drawer is opened.

From the above description it will be seen that all of the objects mentioned in the first part of the specification are attained in a simple, economical and advantageous manner, and also that the principle of the invention, whether carried out in the form described above or otherwise, provides for numerous improvements over existing cash-registers. The whole machine is mounted in such a way that it can be readily placed in condition for turning to any desired angle; the operation of the various parts is controlled by the operation of the keys and the operating bar; each key is locked in the position in which it is left by the operator while the various other parts are performing their functions; an error in striking the keys can be corrected in a very simple manner, and the means which I have shown for locking and unlocking the keys is very simple and effective and does not involve the complications usually a feature of cash-registers; the same may be said of the indicating mechanism and of the adding and printing devices. The various improvements in these several features need not be again mentioned here, but it may be stated that the operator can print the total and set the machine back to zero without being able to see the amount of the total, and that the printing of the slips simultaneously with that of the ribbon which is left in the machine is also an important feature. In short, I have produced a drawer-operated machine which performs all the functions which can be performed upon the complicated crank-operated machines that are now in use, and which also accomplishes additional results.

Having thus described my invention, I claim as new and desire to secure by Letters Patent:

1. In a cash register, the combination of a base, a table rotatably mounted thereon, a frame on the table, an operating bar on the frame, a set of keys, and means connected with the operating bar for controlling the operation of said keys.

2. In a cash register, the combination of a base, a table normally resting on the base, a plate, bearings on the plate for the table, and means for raising the plate whereby the bearings will engage and lift the table.

3. In a cash register, the combination of a base having a depression, a plate having roller bearings movably mounted in said depression, a cam for raising said plate, and a table over said plate normally resting on said base whereby the raising of the plate will cause the table to be lifted from the base and to rest upon said bearings.

4. In a cash register, the combination of a base having a depression, a plate having roller bearings movably mounted in said depression, a cam for raising said plate, a table over said plate normally resting on said base whereby the raising of the plate will cause the table to be lifted from the base and to rest upon said bearings, a drawer movably mounted in said table, an operating bar, and means connected with said bar for controlling the opening of said drawer.

5. In a cash register, the combination of a frame having side pieces, an operating bar pivotally mounted in said frame, a cross-bar resting in the frame and slidable thereon, a spring connecting the operating bar and the cross bar for moving the cross-bar in one direction, a pin connecting the operating bar with the cross-bar for forcing the cross-bar in a direction opposite to that in which it is moved by the spring.

6. In a cash register, the combination of a frame having side pieces, an operating bar pivotally mounted in said frame, a cross-bar resting in the frame and slidable thereon, a spring connecting the operating bar and the cross bar for moving the cross-bar in one direction, a pin connecting the operating bar with the cross-bar for forcing the cross-bar in a direction opposite to that in which it is moved by the spring, and a series of keys pivotally mounted upon the frame, each key being provided with notches for the reception of the cross-bar.

7. In a cash register, the combination of a frame having side pieces, an operating bar pivotally mounted in said frame, a cross-bar resting in the frame and slidable thereon, a spring connecting the operating bar to the cross bar for moving the cross-bar in one direction, a pin connecting the operating bar with the cross-bar for forcing the cross-bar in a direction opposite to that in which it is moved by the spring, and a series of keys movably mounted on the frame, each key being provided with a projection having two spaces separated by a tooth, each of these spaces being adapted to receive said cross-bar, and the cross-bar being adapted to lock the keys when in said spaces.

8. In a cash register, the combination of a frame having side pieces, an operating bar pivotally mounted in said frame, a cross-bar resting in the frame and slidable thereon, a spring connecting the operating bar to the cross bar for moving the cross-bar in one direction, a pin connecting the operating bar with the cross-bar for forcing the cross-bar in a direction opposite to that in which it is moved by the spring, a series of keys movably mounted on the frame, each key being provided with a projection having two spaces separated by a tooth, each of these spaces being adapted to receive said cross-bar and the cross-bar being adapted to lock the keys when in said spaces, said keys being arranged in sets, and a movable plate located adjacent to each set of keys and having means for holding the keys in depressed position.

9. In a cash register, the combination of a plurality of sets of keys, a pivoted plate located under each set of keys, resilient means for pressing said plates toward the keys, a tooth upon each key adapted to engage said plate when the keys are depressed, the plate being adapted to hold the keys in depressed position, a rod having projections thereon adapted to engage said pivoted plates when the rod is turned and move the plates out of reach of the keys, a cam connected with said rod, and a drawer having means for engaging said cam when it is closed, whereby the keys are released.

10. In a cash register, the combination of a drawer, a set of keys, means for holding any one of said keys when depressed, constructed for releasing a key so held when another key of the same set is depressed and for engaging the second key with the holding means, a rod for moving the holding means out of engagement with the keys, means connected with said drawer for operating said rod when the drawer is closed and a registering device controlled by said keys.

11. In a cash register, the combination of a set of keys each having a projection, means for holding said keys when depressed, means for releasing any depressed key when another of the same set is depressed, a plate having teeth movable in a path intersecting the path of movement of said projections, said plate being adapted to be stopped by said projections in a position indicating the key struck, an operating means, resilient means for moving said plate toward said projections when the operating means is manipulated, and a registering device controlled by said plate.

12. In a cash register, the combination of a plurality of keys each having a downwardly extending projection, a movably mounted plate, means for yieldingly pressing said plate toward said projections, a sliding plate having graduated teeth located in a position to engage said first-named plate when in an elevated position and to engage the projection on any key when the latter is depressed, and a registering device controlled by the position of said second plate.

13. In a cash-register, the combination of a drawer, a bar connected therewith and movable simultaneously with the drawer, a series of slides each having a projection engaging said bar, means for moving said projections toward the bar, means for limiting the motion of the slides, and printing surfaces located on the slides.

14. In a cash register, the combination of a movable drawer, a bar, resilient means for moving said bar when the drawer is open, a series of slides each having a projection engaging said bar whereby the bar acts as a stop for the slides, resilient means for forcing the slides toward the bar, and a plurality of printing surfaces located upon said slides.

15. In a cash register, the combination of a differentially movable slide having a series of type on one side thereof, and provided with an angle projection extending from said slide, one of the legs of said angle also having a series of type thereon, with means for taking impressions from said series of type.

16. In a cash register, the combination with a differentially movable slide having a series of type on one side thereof, and provided with an angle projection extending from said slide, one of the legs of said angle also having a series of type thereon, of means for moving said slides, means for limiting the movement of said slides to adjust any desired type to a printing point, and means for taking impressions from said type when adjusted.

17. A cash register comprising a movable member having a check-printing surface, means for supporting a printing ribbon above said surface, an impression hammer, a drawer, and means for causing said hammer to strike a blow on the printing surface when the drawer is moved; said means comprising a slide controlled by the drawer and having a cam surface thereon, and a stud on the hammer engaging said cam surface.

18. A cash register comprising a movable member having a check-printing surface, means for supporting a printing ribbon above said surface, an impression hammer, a drawer, and means for causing said hammer to strike a blow on the printing surface when the drawer is moved; said means comprising a pivotally mounted hammer, resilient means for forcing said hammer toward the printing surface, and a movable cam for lifting the hammer and releasing it.

19. In a cash register, the combination with type carriers of means for differentially adjusting same, a sliding cash safe, means for taking an impression from said carriers, a normally latched operating means for said impression means, and means movable with said cash safe for releasing said latching means after the type carriers have been adjusted as desired.

20. In a cash-register, the combination of a movable member having two printing surfaces thereon, means for supporting a ribbon adjacent to one printing surface, a hammer, an operating drawer, means connected with said drawer for causing the hammer to strike a blow upon said ribbon, an inking ribbon located adjacent to the other printing surface, and means connected to the last-named means for feeding said second printing ribbon; the last means comprising a lever adapted to be engaged by the second means, and a ratchet mechanism operatively connected with said lever.

21. In a cash register, the combination of a movable member having two printing surfaces, an operating drawer, a hammer mounted adjacent to one of said printing surfaces, means connected with the drawer for operating said hammer, a printing ribbon located adjacent to the second printing surface, means connected with the first-named means for intermittently feeding said ribbon, a second hammer, and means connected with the drawer for causing said second hammer to strike a blow on the second ribbon.

22. In a cash register, the combination of a movable member having two printing surfaces, an operating drawer, a hammer mounted adjacent to one of said printing surfaces, means connected with the drawer for operating said hammer, a printing ribbon located adjacent to the second printing surface, means connected with the first-named means for intermittently feeding said ribbon, a second hammer, and means connected with the drawer for causing said second hammer to strike a blow on the said ribbon; said last-named means comprising a pin adapted to move when the drawer is moved, a lever operated by said pin, a slide connected with said lever, a cam for supporting said second hammer, and means for releasing said cam from engagement with the second hammer when the drawer is moved.

23. In a cash register, the combination of a drawer, a shaft adapted to be rotated when the drawer is moved, a pin connected with said shaft, a lever adapted to be engaged by said pin, a slide connected with the lever, and a printing hammer adapted to be supported by said slide.

24. In a cash-register, the combination of a drawer, a shaft adapted to be rotated when the drawer is moved, a pin connected with said shaft, a lever adapted to be engaged by said pin, a slide connected with the lever, a printing hammer adapted to be supported by said slide, a cam movable into a position to support the hammer, an arm connected with said cam, and means connected with the drawer and with said arm for moving the cam out of supporting position.

25. In a cash register, the combination of a printing hammer, resilient means for forcing it into printing position, a movably-mounted cam adapted to support the hammer, resilient means for moving the cam out of supporting position, an arm connected with the cam, and means for moving the arm and cam into a position to support the hammer against the opposition of the second resilient means.

26. In a cash register, the combination of a printing hammer, resilient means for forcing it into printing position, a movably-mounted cam adapted to support the hammer, a spring for moving the cam out of supporting position, an arm connected with the cam, and means for moving the arm and cam into a position to support the hammer against the opposition of said spring; said last-named means comprising an operating lever and a pin movable thereby and engaging said arm.

27. In a cash register, the combination with a plurality of type carriers, of a pivoted platen for taking impressions from same, a slide for withdrawing said platen, a cam for supporting said platen when withdrawn, and an operating lever and means controlled thereby for withdrawing said cam support.

28. A cash register, comprising a hammer and a pivoted cam for supporting the hammer, said cam having an upper surface adapted to engage a portion of the hammer, and a side surface slanting away from said upper surface; said cam also being provided with an arm for moving it into and out of engagement with the hammer.

29. In a cash register, the combination of a pivotally mounted printing hammer, a spring for forcing the hammer into printing position, a slide having a projection adapted to engage one side of the hammer and force it away from printing position, said hammer being provided with a projection, and a cam adapted to engage the last-named projection and hold the hammer away from printing position.

30. In a cash register, the combination of a pivotally mounted printing hammer, a spring for forcing the hammer into printing position, a slide having a projection adapted to engage one side of the hammer and force it away from printing position, said hammer being provided with a projection, a cam adapted to engage the last-named projection and hold the hammer away from printing position, a device for supporting a paper for receiving an impression, and means on said slide for feeding said paper-supporting means.

31. In a cash register, the combination of a drawer, a shaft adapted to be rotated when the drawer is moved, a pin connected with said shaft, a lever adapted to be engaged by said pin, a slide connected with the lever, a printing hammer adapted to be supported by said slide, a cam movable into a position to support the hammer, an arm connected with said cam, means connected with the drawer and with said arm for moving the cam out of supporting position, a device for supporting a paper for receiving an impression, and means on said slide for feeding said paper-supporting means.

32. In a cash register, the combination of a roller for supporting a paper, a ratchet-wheel connected with said roller, a slide having a tooth adapted to engage said ratchet wheel and feed it forward one step for every movement of the slide, a printing hammer, and means connected with the slide for moving the hammer.

33. In a cash register, the combination of a roller for supporting a paper, a ratchet-wheel connected with said roller, a slide having a tooth adapted to engage said ratchet wheel and feed it forward one step for every movement of the slide, a printing hammer, means connected with the slide for moving the hammer, a device for supporting a printing ribbon, and means operable simultaneously with said slide for feeding the printing ribbon.

34. In a cash register, the combination of a drawer, a printing hammer, means operable by the drawer for withdrawing the hammer from printing position, a printing ribbon, means operable by the drawer for feeding said printing ribbon, a series of type surfaces, and means controlled by the drawer for moving said type surfaces adjacent to the ribbon.

35. In a cash register, the combination of a drawer, a printing hammer, means operable by the drawer for withdrawing the hammer from printing position, a printing ribbon, means operable by the drawer for feeding said printing ribbon, a series of type surfaces, means controlled by the drawer for moving said type surfaces adjacent to the ribbon, an additional hammer adapted to engage said ribbon, and means for manipulating said last-named hammer, said ribbon being provided with portions having different colors.

36. In a cash register, the combination of a printing ribbon having two colors, a hammer located adjacent to each of the colored portions of the ribbon, manually-operated means for manipulating one hammer, automatic means for operating the other hammer, two sets of printing surfaces located below the ribbon, automatic means for moving said printing surfaces into position beneath the two hammers, means for supporting a paper adjacent to said ribbon, means connected with said automatic operating means for feeding said paper, and means connected with the hand-operated means for feeding the paper at a more rapid rate.

37. In a cash register, the combination of a pair of rollers for supporting a paper, a printing ribbon located adjacent to said paper and having two colors, two hammers adapted to engage said printing ribbon, automatic means for operating one of said hammers, a manually-operated lever, a slide connected with said lever, and a cam on the slide adapted to engage the second hammer.

38. In a cash register, the combination of a pair of rollers for supporting a paper, a printing ribbon located adjacent to said paper and having two colors, two hammers adapted to engage said printing ribbon, automatic means for operating one of said hammers, a manually-operated lever, a slide connected with said lever, a cam on the slide adapted to engage the second hammer, means connected with said automatic operating means for feeding the paper one step for every stroke of the hammer, and means connected with said slide for feeding the paper a plurality of steps for every stroke of the slide.

39. In a cash register, the combination of a paper-supporting roller having a ratchet-wheel, a slide having a tooth adapted to engage said ratchet-wheel, means for moving said slide a distance equal to the pitch of the ratchet-wheel, a printing hammer, means for controlling the operation of said printing hammer through the instrumentality of said slide, a manually-operated lever, a slide connected therewith, a second hammer, means for operating said second hammer once for every operation of the second slide, a pawl connected with said second slide and adapted to engage said ratchet-wheel, the reciprocation of said slide and pawl being sufficient to rotate the ratchet-wheel a distance greater than that through which it is rotated by the first-mentioned slide.

40. In a cash register, the combination of a roller having a ratchet-wheel and adapted to support and feed a paper, a reciprocable slide, a tooth thereon for engaging the ratchet-wheel and feeding the latter, a hammer controlled by said slide, a second slide, a second hammer controlled by the second slide, and a pawl on the second slide adapted to engage the ratchet-wheel.

41. In a cash register, the combination of a printing ribbon having two colors, a hammer located adjacent to each of the colored portions of the ribbon, manually-operated means for manipulating one hammer, automatic means for operating the other hammer, two sets of printing surfaces located below the ribbon, and automatic means for moving said printing surfaces into position beneath the two hammers; one of said printing surfaces comprising a series of printing wheels and the other a series of reciprocable slides.

42. In a cash register, the combination of a printing ribbon having two colors, a hammer located adjacent to each of the colored portions of the ribbon, manually-operated means for manipulating one hammer, automatic means for operating the other hammer, two sets of printing surfaces located below the ribbon, automatic means for moving said printing surfaces into position beneath the two hammers, one of said printing surfaces comprising a series of printing wheels and the other a series of reciprocable slides, means for reciprocating said slides, and means for rotating said wheels.

43. In a cash register, the combination of a printing device consisting of a reciprocable printing surface, a rotatable printing surface, an inking ribbon having two colors, one adapted to register with each of said printing surfaces, two hammers, means for automatically moving parts of the reciprocating printing surface and means for thereafter moving corresponding parts of the rotatable printing surface the same distance.

44. In a cash register, the combination of a printing device consisting of a reciprocable printing surface, a rotatable printing surface, an inking ribbon having two colors, one adapted to register with each of said printing devices, two hammers, means for automatically moving parts of the riciprocating printing surface, means for thereafter moving corresponding parts of the rotatable printing surface the same distance, means for returning the reciprocating printing surface to original position, and means for continuing the rotation of the rotatable printing surface upon each subsequent reciprocation of the reciprocating surface, whereby the rotatable printing surface constitutes an adding device for the reciprocating surface.

45. In a cash register, the combination with a plurality of reciprocable type carrying slides, of racks moved thereby, segment gears meshing with said racks and type wheels alternated with said slides and operated by said segment gears.

46. In a cash register, the combination of a series of ratchet-wheels, a segmental gear and one-way connection therefrom to each ratchet-wheel, a rack meshing with each segmental gear, means for reciprocating the rack, and a type-wheel connected with each ratchet-wheel.

47. In a cash register, the combination of a series of segmental gears, a series of ratchet-wheels concentrically mounted therewith, a spring pawl upon each segmental gear adapted to engage the ratchet-wheels and rotate them in one direction, a drawer, means for oscillating the segmental gears when the drawer is moved, whereby the ratchet-wheels will be rotated by the continued oscillation of the segmental gears, and a series of type-wheels, one connected with each ratchet-wheel.

48. In a cash register, the combination of a series of segmental gears, a series of ratchet-wheels concentrically mounted therewith, a spring pawl upon each segmental gear adapted to engage the ratchet-wheels and rotate them in one direction, a drawer, means for oscillating the segmental gears when the drawer is moved, whereby the ratchet-wheels will be rotated by the continued oscillation of the segmental gears, a series of type-wheels, one connected with each ratchet-wheel, and means for connecting the gears with the ratchet-wheels comprising a series of pawls mounted on the gears and engaging the teeth of the ratchet-wheels, and a spring for forcing each pawl into engagement with said teeth.

49. In a cash register, the combination of a series of segmental gears, a series of ratchet-wheels concentrically mounted therewith, a spring pawl upon each segmental gear adapted to engage the ratchet-wheels and rotate them in one direction, a drawer, means for oscillating the segmental gears when the drawer is moved, whereby the ratchet-wheels will be rotated by the continued oscillation of the segmental gears, a series of type-wheels, one connected with each ratchet-wheel, and means for connecting the gears with the ratchet-wheels comprising a series of pawls mounted on the gears and engaging the teeth of the ratchet-wheels, and a spring for forcing each pawl into engagement with said teeth, each pawl being provided with a pin and means for engaging said pins and moving the pawls out of engagement with the ratchet-wheels, thereby permitting the oscillation of the gears without transmitting motion to the ratchet-wheels.

50. In a cash register, the combination of a gear, means for oscillating it, a pawl mounted on said gear, said pawl having a projection provided with a pin, a ratchet-wheel concentrically mounted with said gear, a spring for forcing said pawl into engagement with the teeth of the ratchet-wheel, whereby the oscillation of the gear will cause the ratchet wheel to rotate in one direction, a rod bearing against the pin between it and the pawl, and means for turning said rod so as to move the pin and cause the pawl to be disengaged from the teeth of the ratchet-wheel.

51. In a cash register, the combination of a gear, means for oscillating it, a pawl mounted on said gear, said pawl having a projection provided with a pin, a ratchet-wheel concentrically mounted with said gear, a spring for forcing said pawl into engagement with the teeth of the ratchet-wheel, whereby the oscillation of the gear will cause the ratchet wheel to rotate in one direction, a rod bearing against the pin between it and the pawl, means for turning said rod so as to move the pin and cause the pawl to be disengaged from the teeth of the ratchet wheel, a pawl for engaging said ratchet-wheel, resilient means for forcing said pawl into engagement with the ratchet-wheel to prevent the latter from moving in a reverse direction, a printing mechanism, and means for transmitting the motion of the ratchet-wheel to said printing mechanism.

52. In a cash register, the combination of a series of ratchet-wheels, a series of gears, means for oscillating said gears, means for transmitting the motion of said gears to said ratchet-wheels to rotate the latter in one direction, a series of disks, one connected with each of said ratchet-wheels, a pin on each of said disks, and means for engaging said pins to stop the rotation of the disks and ratchet-wheels at a certain point.

53. In a cash register, the combination of a series of ratchet-wheels, a series of oscillating members, means for transmitting motion from said oscillating members to the ratchet-wheels to rotate the latter in one direction, a series of type-wheels connected with the ratchet-wheels, and a zero-setting device comprising a disk connected with each ratchet-wheel and having a series of pins and a finger adapted to be moved into the path of said pins so as to prevent the rotation of the disks at a certain point.

54. In a cash register, the combination of a series of ratchet-wheels, a series of oscillating members, means for transmitting motion from said oscillating members to the ratchet-wheels to rotate the latter in one direction, a series of type-wheels connected with the ratchet-wheels, a zero-setting device comprising a disk connected with each ratchet-wheel and having a series of pins and a finger adapted to be moved into the path of said pins so as to prevent the rotation of the disks at a certain point, and means for transmitting motion of one ratchet-wheel beyond a certain point to another ratchet-wheel to rotate the latter one step.

55. In a cash register, the combination of a series of ratchet-wheels, a series of oscillating members, means for transmitting motion from said oscillating members to the ratchet-wheels to rotate the latter in one direction, a series of type-wheels connected with the ratchet-wheels, a zero-setting device comprising a disk connected with each ratchet-wheel and having a series of pins and a finger adapted to be moved into the path of said pins so as to prevent the rotation of the disks at a certain point, and means for transmitting motion of one ratchet-wheel beyond a certain point to another ratchet-wheel to rotate the latter one step; said last-named means comprising a series of reciprocable bars each having a pawl engaging the teeth of one of the ratchet-wheels, means for holding said bars in elevated position, and means for releasing said holding means.

56. In a cash register, the combination of a series of ratchet-wheels, means for rotating them, a series of type surfaces each connected with one of the ratchet-wheels, a series of reciprocating bars each having a pawl in engagement with the teeth of a ratchet-wheel, means for moving said bars thus transmitting motion to the ratchet-wheels one step at a time, means for holding said bars in elevated position, and means for releasing each bar when the next ratchet-wheel passes the zero point, thereby placing the bar in a position to be again elevated so as to feed the ratchet-wheel forward one step.

57. In a cash-register, the combination of a series of ratchet-wheels, a series of reciprocating bars mounted adjacent thereto and each having a pawl engaging the teeth of one of the ratchet-wheels, a drum having a plurality of series of projections, each series of projections being adapted to move the reciprocating bar and feed the corresponding ratchet-wheel, a shaft mounted adjacent to said bars and having a plurality of pawls engaging the bars for holding the latter in elevated position when moved by said projections, and means for removing said pawls from the bars to permit them to drop.

58. In a cash-register, the combination of a series of ratchet-wheels, a series of reciprocating bars mounted adjacent thereto and each having a pawl engaging the teeth of one of the ratchet-wheels, a drum having a plurality of series of projections, each series of projections being adapted to move a reciprocating bar and feed the corresponding ratchet-wheel, a shaft mounted adjacent to said bars and having a plurality of pawls engaging the bars for holding the latter in elevated position when moved by said projections, and means for removing said pawls from the bars to permit them to drop; said means comprising a series of disks mounted adjacent to said ratchet-wheels, each having a series of plates corresponding to the zero points of the ratchet-wheels and adapted to engage said pawls.

59. In a cash-register, the combination of a series of ratchet-wheels, a series of reciprocating bars mounted adjacent thereto and each having a pawl engaging the teeth of one of the ratchet-wheels, a drum having a plurality of series of projections, each series of projections being adapted to move a reciprocating bar and feed the corresponding ratchet-wheel, a shaft mounted adjacent to said bars and having a plurality of pawls engaging the bars for holding the latter in elevated position when moved by said projections, means for removing said pawls from the bars to permit them to drop, said means comprising a series of disks mounted adjacent to said ratchet-wheels, each having a series of plates corresponding to the zero points of the ratchet-wheels and adapted to engage said pawls, and a zero-setting device comprising a pivoted plate having means for engaging said disks at their zero points and having a plate adapted to engage said bars and hold them in elevated position independently of the pawls.

60. In a cash register, the combination with a plurality of accumulating members, of pawls for operating same, a special key and an arm controlled by said key for displacing said pawls and retaining same displaced during the stroke of the pawls to prevent operation of said members.

61. In a cash register, the combination with a plurality of adding wheels, of pawls for rotating said wheels, a special key, and curved arms controlled by said key and serving to rock said pawls out of connection with said wheels and to maintain said pawls out of connection during their entire stroke.

62. In a cash register, the combination with a plurality of rotatable adding members, of keys and pawls controlled thereby for moving said members differentially, special keys, and curved arms controlled by said keys when operated for withdrawing said pawls from said wheels, said arms serving to maintain the pawls from contact with said wheels as long as the special keys remain in operated position.

63. In a cash register, the combination with indicating and printing mechanism, of a cash drawer controlling the setting movements of same, means for operating said indicating mechanism, means for taking impressions from said printing mechanism, and a drawer controlled slide serving to operate said impression mechanism and to release said indicator operating mechanism.

64. In a cash register, the combination with detail printing type bars, of total printing members alternated between said bars, means for taking impressions from said bars or members as desired and an inking ribbon common to said bars and members.

65. In a cash register, the combination with an operating mechanism, of type bars for printing each amount entered in the machine, type members for printing the totals of all amounts entered, said members alternated between said bars, a two color ink ribbon for taking impressions from said bars and members in different colors, and impression taking means for said bars and members.

66. In a cash register, the combination with means for printing items and totals, of carrying and feeding devices for a record material, means for giving said feeding devices a normal movement when an item is printed, and a hand lever for giving said devices an abnormal movement after a total has been printed.

67. In a cash register, the combination with differentially movable registering members, of racks for operating same, transfer slides for said members, means normally supporting said slides, devices on said registering members for withdrawing said supporting means, and cams for restoring said slides to normal to operate the transfers.

68. In a cash register, the combination with registering devices, of transfer slides for same, a stop to set said devices at zero, said slides having notches into which said stop may move, the location of the notches being such that the stop cannot be moved to stopping position except when said slides have been reset.

69. In a cash register, the combination with type for printing items and totals, means for taking impressions from said type, a record material feeding device and means for giving a movement to said feeding device in conjunction with an item impression; of a lever for operating said impression means to print a total, and connections from said lever for giving a movement to said feeding device.

70. In a cash register, the combination with a depressible key, and an operating bar, of devices for latching said key and said operating bar in depressed positions, means controlled by said operating bar for locking said key in depressed position while said operating bar is out of normal position, and means for releasing the latching device for said operating bar to permit it to resume its normal position.

71. In a cash register, the combination with differentially movable registering members, of racks for operating same, transfer slides for said members adapted by their movement to actuate the latter, means normally supporting said slides, means on said registering members for withdrawing said supporting means, and cams for restoring said slides to normal position to operate the transfers.

72. In a cash register, the combination with differentially movable registering members, of a transfer device for transmitting a single step of movement from the member of lower order to the member of higher order, said device comprising a slide, means carried by said slide for actuating the member of higher order, means normally supporting said slide in elevated position, means on said member of lower order for withdrawing said supporting means, and a cam for restoring said slide to normal position to effect a transfer.

73. In a cash register, the combination with a totalizing mechanism including two differentially movable registering members, of a transfer device for transmitting a single step of movement from the member of lower order to the member of higher order said device comprising a slide for actuating the member of higher order, means normally supporting the said slide in elevated position, means associated with the member of lower order for withdrawing said supporting means, and a cam for restoring said slide to normal position to effect an actuation of the member of higher order.

74. In a cash register, the combination of a printing ribbon having two colors thereon, two sets of printing surfaces movably located adjacent to said ribbon, one of said printing surfaces comprising a series of printing wheels and the other a series of reciprocable slides, means for moving said printing surfaces, two printing hammers, one adapted to strike the ribbon on a portion having one color and the other upon a portion having another color, and means for manipulating said hammers.

75. In a cash register, the combination of a printing ribbon having two colors thereon, two sets of printing surfaces movably located adjacent to said ribbon, one of said printing surfaces comprising a series of printing wheels and the other a series of reciprocable slides, two printing hammers, one adapted to strike the ribbon on a portion having one color and the other upon a portion having another color, means for manipulating said hammers, and means for moving said printing surfaces into a position beneath the two hammers.

76. In a cash register, the combination of a printing ribbon having two colors thereon, two sets of printing surfaces movably located adjacent to said ribbon, each set comprising a plurality of type bearing elements, means for moving said printing surfaces, two printing hammers, one adapted to strike the ribbon on a portion having one color and the other upon a portion having another color, and means for manipulating said hammers.

77. In a cash register, the combination of a printing ribbon having two colors thereon, two sets of printing surfaces movably located adjacent to said ribbon, each set comprising a plurality of type bearing elements, two printing hammers, one adapted to strike the ribbon on a portion having one color and the other upon a portion having another color, means for manipulating said hammers, and means for moving said printing surfaces into a position beneath the two hammers.

In testimony whereof I have signed my name to this specification in the presence of two subscribing witnesses.

CARL L. NELSON.

Witnesses:
ALBERT E. FAY,
JNO. M. RITTER.